(12) United States Patent
Lundberg et al.

(10) Patent No.: US 9,659,071 B2
(45) Date of Patent: *May 23, 2017

(54) PATENT MAPPING

(71) Applicant: Schwegman Lundberg & Woessner, P.A., Minneapolis, MN (US)

(72) Inventors: Steven W. Lundberg, Edina, MN (US); Janal M. Kalis, Minneapolis, MN (US); Pradeep Sinha, Medina, MN (US)

(73) Assignee: Schwegman Lundberg & Woessner, P.A., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,549

(22) Filed: Nov. 23, 2015

(65) Prior Publication Data

US 2016/0078109 A1    Mar. 17, 2016

Related U.S. Application Data

(63) Continuation of application No. 13/365,062, filed on Feb. 2, 2012, now Pat. No. 9,201,956, which is a
(Continued)

(51) Int. Cl.
*G06F 17/30* (2006.01)
*G06Q 30/02* (2012.01)
(Continued)

(52) U.S. Cl.
CPC .... *G06F 17/30554* (2013.01); *G06F 17/3053* (2013.01); *G06F 17/30528* (2013.01);
(Continued)

(58) Field of Classification Search
CPC ........ G06F 17/30554; G06F 17/30528; G06F 17/30867; G06F 17/3053; G06F 17/30657;
(Continued)

(56) References Cited

U.S. PATENT DOCUMENTS 4,807,154 A    2/1989  Scully et al.
4,868,733 A *  9/1989  Fujisawa ........... G06F 17/30011
                                             707/E17.008
(Continued)

FOREIGN PATENT DOCUMENTS

AU    2006272510        2/2012
AU    2012200701 B2     5/2014
(Continued)

OTHER PUBLICATIONS

Juan M. Madrid and Susan Gauch—Proceedings of the 11th Conference on . . . , 2002—crazyboy.com "Incorporating Conceptual Matching in Search"—pp. 1-17.*
(Continued)

*Primary Examiner* — Anh Ly
(74) *Attorney, Agent, or Firm* — Schwegman Lundberg & Woessner, P.A.

(57) ABSTRACT

The present subject matter provides systems, methods, software, and data structures for patent mapping, storage, and searching. Some such embodiments include mapping patent documents, claims, and claim limitations. Some further embodiments provide for searching a universe of patent documents by patent document, claim, limitation, class, element, or concept.

9 Claims, 18 Drawing Sheets

Related U.S. Application Data continuation of application No. 11/494,278, filed on Jul. 27, 2006, now Pat. No. 8,161,025.

(60) Provisional application No. 60/703,413, filed on Jul. 27, 2005.

(51) Int. Cl.
*G06Q 50/22* (2012.01)
*G06Q 50/18* (2012.01)

(52) U.S. Cl.
CPC .. *G06F 17/30657* (2013.01); *G06F 17/30705* (2013.01); *G06F 17/30728* (2013.01); *G06F 17/30734* (2013.01); *G06F 17/30867* (2013.01); *G06Q 30/0207* (2013.01); *G06Q 50/184* (2013.01); *G06Q 50/22* (2013.01); *G06F 2216/11* (2013.01)

(58) Field of Classification Search
CPC ......... G06F 17/30705; G06F 17/30389; G06F 17/30728; G06F 2216/11; G06F 17/30734; G06F 17/30; G06F 17/30684; G06F 17/30371; G06F 17/30321; G06F 17/30336; G06F 11/10; G06F 11/16; G06F 17/30716; G06F 17/30094; G06F 17/30424; G06F 17/30345; G06F 17/2247; G06Q 50/184; G06Q 50/22; G06Q 30/0207; G06Q 10/00; G06Q 50/134; G05Q 10/00
See application file for complete search history.

(56) References Cited

U.S. PATENT DOCUMENTS

| | | | |
|---|---|---|---|
| 5,297,039 | A | 3/1994 | Kanaegami et al. |
| 5,329,447 | A | 7/1994 | Leedom, Jr. |
| 5,404,506 | A | 4/1995 | Fujisawa et al. |
| 5,410,646 | A | 4/1995 | Tondevold et al. |
| 5,530,852 | A | 6/1996 | Meske et al. |
| 5,548,506 | A | 8/1996 | Srinivasan |
| 5,548,753 | A | 8/1996 | Linstead et al. |
| 5,553,226 | A | 9/1996 | Kiuchi et al. |
| 5,555,408 | A | 9/1996 | Fujisawa et al. |
| 5,557,515 | A | 9/1996 | Abbruzzese et al. |
| 5,592,664 | A | 1/1997 | Starkey |
| 5,623,679 | A | 4/1997 | Rivette et al. |
| 5,623,681 | A | 4/1997 | Rivette et al. |
| 5,644,740 | A | 7/1997 | Kiuchi |
| 5,659,729 | A | 8/1997 | Nielsen |
| 5,664,063 | A | 9/1997 | Johnson et al. |
| 5,664,714 | A | 9/1997 | Navarro et al. |
| 5,694,523 | A * | 12/1997 | Wical .................. G06F 17/274 706/45 |
| 5,696,916 | A | 12/1997 | Yamazaki et al. |
| 5,699,528 | A | 12/1997 | Hogan |
| 5,721,910 | A | 2/1998 | Unger et al. |
| 5,745,745 | A | 4/1998 | Tada et al. |
| 5,754,840 | A | 5/1998 | Rivette et al. |
| 5,758,328 | A | 5/1998 | Giovannoli |
| 5,768,580 | A | 6/1998 | Wical |
| 5,774,833 | A | 6/1998 | Newman |
| 5,787,411 | A | 7/1998 | Groff et al. |
| 5,794,236 | A | 8/1998 | Mehrle |
| 5,799,325 | A | 8/1998 | Rivette et al. |
| 5,809,318 | A | 9/1998 | Rivette et al. |
| 5,850,520 | A | 12/1998 | Griebenow et al. |
| 5,870,745 | A | 2/1999 | McCune |
| 5,895,468 | A | 4/1999 | Whitmyer, Jr. |
| 5,903,881 | A | 5/1999 | Schrader et al. |
| 5,907,837 | A | 5/1999 | Ferrel et al. |
| 5,940,821 | A * | 8/1999 | Wical .................. G06F 17/30672 707/E17.074 |
| 5,953,726 | A | 9/1999 | Carter et al. |
| 5,970,463 | A | 10/1999 | Cave et al. |
| 5,991,751 | A | 11/1999 | Rivette et al. |
| 5,991,756 | A | 11/1999 | Wu |
| 5,991,780 | A | 11/1999 | Rivette et al. |
| 6,006,221 | A | 12/1999 | Liddy et al. |
| 6,014,663 | A | 1/2000 | Rivette et al. |
| 6,038,561 | A * | 3/2000 | Snyder .............. G06F 17/30011 707/E17.093 |
| 6,049,801 | A | 4/2000 | Whitmyer, Jr. |
| 6,055,538 | A | 4/2000 | Kessenich et al. |
| 6,076,088 | A | 6/2000 | Paik et al. |
| 6,182,062 | B1 | 1/2001 | Fujisawa et al. |
| 6,182,078 | B1 | 1/2001 | Whitmyer, Jr. |
| 6,216,128 | B1 | 4/2001 | Di-Crescenzo et al. |
| 6,226,792 | B1 | 5/2001 | Goiffon et al. |
| 6,263,335 | B1 | 7/2001 | Paik et al. |
| 6,327,593 | B1 | 12/2001 | Goiffon |
| 6,339,767 | B1 | 1/2002 | Rivette et al. |
| 6,363,361 | B1 | 3/2002 | Lundberg |
| 6,415,319 | B1 | 7/2002 | Ambroziak |
| 6,453,312 | B1 | 9/2002 | Goiffon et al. |
| 6,499,026 | B1 | 12/2002 | Rivette et al. |
| 6,502,081 | B1 | 12/2002 | Wiltshire, Jr. et al. |
| 6,574,632 | B2 | 6/2003 | Fox et al. |
| 6,662,178 | B2 | 12/2003 | Lee |
| 6,665,670 | B2 | 12/2003 | Winer et al. |
| 6,675,159 | B1 * | 1/2004 | Lin .................. G06F 17/2705 707/E17.099 |
| 6,678,692 | B1 | 1/2004 | Hyatt |
| 6,694,331 | B2 | 2/2004 | Lee |
| 6,751,621 | B1 | 6/2004 | Calistri-Yeh et al. |
| 6,823,331 | B1 | 11/2004 | Abu-Hakima |
| 6,847,966 | B1 | 1/2005 | Sommer et al. |
| 6,847,979 | B2 | 1/2005 | Allemang et al. |
| 6,885,999 | B1 | 4/2005 | Corless |
| 6,889,223 | B2 | 5/2005 | Hattori et al. |
| 6,941,553 | B2 | 9/2005 | Eisler et al. |
| 6,970,842 | B1 | 11/2005 | Ashby |
| 6,970,881 | B1 | 11/2005 | Mohan et al. |
| 6,976,016 | B2 | 12/2005 | Chang |
| 6,980,984 | B1 * | 12/2005 | Huffman .......... G06F 17/30657 707/E17.069 |
| 6,981,007 | B1 | 12/2005 | Whitmyer, Jr. |
| 7,003,516 | B2 | 2/2006 | Dehlinger et al. |
| 7,016,852 | B1 | 3/2006 | Lee |
| 7,016,895 | B2 | 3/2006 | Dehlinger et al. |
| 7,024,408 | B2 | 4/2006 | Dehlinger et al. |
| 7,035,463 | B1 | 4/2006 | Monobe et al. |
| 7,054,854 | B1 | 5/2006 | Hattori et al. |
| 7,054,856 | B2 | 5/2006 | Won et al. |
| 7,080,067 | B2 | 7/2006 | Nonomura et al. |
| 7,085,771 | B2 | 8/2006 | Chung et al. |
| 7,158,983 | B2 | 1/2007 | Willse et al. |
| 7,231,384 | B2 | 6/2007 | Wu et al. |
| 7,231,386 | B2 | 6/2007 | Nonomura et al. |
| 7,293,018 | B2 | 11/2007 | Hattori et al. |
| 7,296,015 | B2 | 11/2007 | Poltorak |
| 7,369,701 | B2 | 5/2008 | Lundberg |
| 7,493,253 | B1 | 2/2009 | Ceusters et al. |
| 7,523,126 | B2 | 4/2009 | Rivette et al. |
| 7,680,733 | B1 | 3/2010 | Lundberg |
| 7,716,226 | B2 | 5/2010 | Barney |
| 7,881,937 | B2 | 2/2011 | Hasan et al. |
| 7,966,328 | B2 | 6/2011 | Germeraad et al. |
| 7,996,753 | B1 | 8/2011 | Chan et al. |
| 8,078,545 | B1 | 12/2011 | Zilka et al. |
| 8,161,025 | B2 | 4/2012 | Lundberg et al. |
| 8,442,814 | B2 | 5/2013 | Ceusters et al. |
| 8,589,413 | B1 | 11/2013 | Mohan et al. |
| 8,812,292 | B2 | 8/2014 | Ceusters et al. |
| 9,201,956 | B2 | 12/2015 | Lundberg et al. |
| 2001/0007977 | A1 | 7/2001 | Geary |
| 2001/0049688 | A1 * | 12/2001 | Fratkina .......... G06F 17/30654 707/E17.068 |
| 2002/0007373 | A1 | 1/2002 | Blair et al. |
| 2002/0022974 | A1 | 2/2002 | Lindh |
| 2002/0029208 | A1 | 3/2002 | Josephson |
| 2002/0035499 | A1 | 3/2002 | Germeraad et al. |

(56) References Cited

U.S. PATENT DOCUMENTS

| | | |
|---|---|---|
| 2002/0035571 A1 | 3/2002 | Coult |
| 2002/0042784 A1 | 4/2002 | Kerven et al. |
| 2002/0052971 A1 | 5/2002 | Okudera et al. |
| 2002/0065675 A1 | 5/2002 | Grainger et al. |
| 2002/0065677 A1 | 5/2002 | Grainger et al. |
| 2002/0091541 A1 | 7/2002 | Lundberg |
| 2002/0091702 A1 | 7/2002 | Mullins |
| 2002/0103654 A1 | 8/2002 | Poltorak |
| 2002/0107896 A1 | 8/2002 | Ronai |
| 2002/0111824 A1 | 8/2002 | Grainger |
| 2002/0111941 A1 | 8/2002 | Roux et al. |
| 2002/0111953 A1 | 8/2002 | Snyder |
| 2002/0138465 A1 | 9/2002 | Lee et al. |
| 2002/0138474 A1 | 9/2002 | Lee |
| 2002/0138475 A1 | 9/2002 | Lee |
| 2002/0143742 A1 | 10/2002 | Nonomura et al. |
| 2002/0147711 A1 | 10/2002 | Hattori et al. |
| 2002/0147738 A1 | 10/2002 | Reader et al. |
| 2002/0161733 A1 | 10/2002 | Grainger |
| 2002/0163541 A1 | 11/2002 | Williams et al. |
| 2002/0174131 A1 | 11/2002 | Winer et al. |
| 2002/0184234 A1 | 12/2002 | Lundberg |
| 2003/0004843 A1 | 1/2003 | Frain |
| 2003/0004936 A1 | 1/2003 | Grune et al. |
| 2003/0026459 A1 | 2/2003 | Won et al. |
| 2003/0033295 A1 | 2/2003 | Adler et al. |
| 2003/0046307 A1 | 3/2003 | Rivette et al. |
| 2003/0050915 A1 | 3/2003 | Allemang et al. |
| 2003/0074354 A1 | 4/2003 | Lee et al. |
| 2003/0084066 A1* | 5/2003 | Waterman .......... G06F 17/30707 707/E17.091 |
| 2003/0115191 A1 | 6/2003 | Copperman et al. |
| 2003/0154085 A1* | 8/2003 | Kelley .................. G06F 17/243 704/275 |
| 2003/0167181 A1 | 9/2003 | Lundberg et al. |
| 2003/0191780 A1* | 10/2003 | Heger ................. G06F 17/3061 707/E17.058 |
| 2003/0195764 A1* | 10/2003 | Baker .................... G06Q 10/10 705/1.1 |
| 2003/0212706 A1 | 11/2003 | Shih |
| 2003/0217335 A1* | 11/2003 | Chung ................. G06F 17/2785 707/E17.084 |
| 2003/0220891 A1 | 11/2003 | Fish |
| 2004/0006457 A1 | 1/2004 | Dehlinger et al. |
| 2004/0006459 A1 | 1/2004 | Dehlinger et al. |
| 2004/0006547 A1 | 1/2004 | Dehlinger et al. |
| 2004/0006558 A1 | 1/2004 | Dehlinger et al. |
| 2004/0006594 A1 | 1/2004 | Boyer et al. |
| 2004/0015481 A1 | 1/2004 | Zinda |
| 2004/0024733 A1 | 2/2004 | Won et al. |
| 2004/0024739 A1* | 2/2004 | Copperman ...... G06F 17/30616 707/E17.074 |
| 2004/0044688 A1 | 3/2004 | Brudz et al. |
| 2004/0054672 A1 | 3/2004 | Tsuchitani et al. |
| 2004/0059736 A1 | 3/2004 | Willse et al. |
| 2004/0059994 A1 | 3/2004 | Fogel et al. |
| 2004/0064438 A1* | 4/2004 | Kostoff ............. G06F 17/30705 707/E17.058 |
| 2004/0078192 A1* | 4/2004 | Poltorak ............. G06F 17/2715 704/9 |
| 2004/0078365 A1 | 4/2004 | Poltorak |
| 2004/0083206 A1 | 4/2004 | Wu et al. |
| 2004/0088332 A1 | 5/2004 | Lee et al. |
| 2004/0103112 A1 | 5/2004 | Colson et al. |
| 2004/0122841 A1 | 6/2004 | Goodman et al. |
| 2004/0133566 A1 | 7/2004 | Ishiguro et al. |
| 2004/0167875 A1* | 8/2004 | Sneiders ............. G06F 17/3043 707/E17.014 |
| 2004/0177068 A1 | 9/2004 | Beretich et al. |
| 2004/0181417 A1 | 9/2004 | Piller et al. |
| 2004/0181427 A1 | 9/2004 | Stobbs et al. |
| 2004/0186705 A1 | 9/2004 | Morgan et al. |
| 2004/0186738 A1 | 9/2004 | Reisman |
| 2004/0199400 A1 | 10/2004 | Lundberg |
| 2004/0260569 A1 | 12/2004 | Bell et al. |
| 2004/0268399 A1 | 12/2004 | Asakawa |
| 2005/0004806 A1 | 1/2005 | Lin et al. |
| 2005/0005239 A1 | 1/2005 | Richards |
| 2005/0010555 A1 | 1/2005 | Gallivan |
| 2005/0060303 A1 | 3/2005 | Wu et al. |
| 2005/0060306 A1 | 3/2005 | Hattori et al. |
| 2005/0080656 A1 | 4/2005 | Crow et al. |
| 2005/0097628 A1* | 5/2005 | Lussier ................. A61K 31/63 800/260 |
| 2005/0108652 A1 | 5/2005 | Beretich, Jr. et al. |
| 2005/0114763 A1 | 5/2005 | Nonomura et al. |
| 2005/0119995 A1 | 6/2005 | Lee |
| 2005/0120011 A1 | 6/2005 | Dehlinger et al. |
| 2005/0131882 A1 | 6/2005 | Beretich et al. |
| 2005/0144177 A1* | 6/2005 | Hodes ..................... G06F 17/27 707/E17.014 |
| 2005/0154673 A1 | 7/2005 | Fellenstein et al. |
| 2005/0165600 A1 | 7/2005 | Kasravi et al. |
| 2005/0182755 A1 | 8/2005 | Tran |
| 2005/0198026 A1 | 9/2005 | Dehlinger et al. |
| 2005/0203768 A1* | 9/2005 | Florance ................ G06Q 50/16 705/313 |
| 2005/0210008 A1* | 9/2005 | Tran .................. G06F 17/30864 707/E17.108 |
| 2005/0210009 A1 | 9/2005 | Tran |
| 2005/0210042 A1 | 9/2005 | Goedken |
| 2005/0216898 A1 | 9/2005 | Powell, Jr. et al. |
| 2005/0228684 A1 | 10/2005 | Pogodin et al. |
| 2005/0234738 A1* | 10/2005 | Hodes .................... G06Q 30/02 705/500 |
| 2005/0234881 A1* | 10/2005 | Burago ............. G06F 17/30646 707/E17.063 |
| 2005/0246194 A1 | 11/2005 | Lundberg |
| 2005/0251383 A1 | 11/2005 | Murray |
| 2005/0256734 A1 | 11/2005 | Clikeman |
| 2005/0289524 A1* | 12/2005 | McGinnes ................ G06F 8/10 717/140 |
| 2006/0026174 A1 | 2/2006 | Lundberg et al. |
| 2006/0026203 A1 | 2/2006 | Tan et al. |
| 2006/0036451 A1 | 2/2006 | Lundberg et al. |
| 2006/0036452 A1 | 2/2006 | Williams |
| 2006/0036453 A1 | 2/2006 | Williams |
| 2006/0036529 A1 | 2/2006 | Williams |
| 2006/0036632 A1 | 2/2006 | Williams |
| 2006/0036635 A1 | 2/2006 | Williams |
| 2006/0074836 A1* | 4/2006 | Gardner .................. G06N 5/02 706/60 |
| 2006/0074991 A1 | 4/2006 | Lussier et al. |
| 2006/0085478 A1 | 4/2006 | Landau et al. |
| 2006/0106793 A1* | 5/2006 | Liang ............... G06F 17/30654 707/E17.108 |
| 2006/0106847 A1 | 5/2006 | Eckardt, III et al. |
| 2006/0112084 A1 | 5/2006 | Mcbeath et al. |
| 2006/0150074 A1 | 7/2006 | Zellner |
| 2006/0161562 A1 | 7/2006 | McFarland et al. |
| 2006/0173903 A1 | 8/2006 | Zimmerman et al. |
| 2006/0173920 A1 | 8/2006 | Adler et al. |
| 2006/0190449 A1 | 8/2006 | Lundberg et al. |
| 2006/0190807 A1 | 8/2006 | Tran |
| 2006/0212402 A1 | 9/2006 | Lundberg et al. |
| 2006/0212480 A1 | 9/2006 | Lundberg et al. |
| 2006/0218188 A1 | 9/2006 | Duncan et al. |
| 2006/0218491 A1 | 9/2006 | Grossman et al. |
| 2006/0224412 A1 | 10/2006 | Frank et al. |
| 2006/0225000 A1 | 10/2006 | Albrecht et al. |
| 2006/0235811 A1 | 10/2006 | Fairweather |
| 2006/0258397 A1 | 11/2006 | Kaplan et al. |
| 2006/0287971 A1 | 12/2006 | Armstrong |
| 2007/0057967 A1 | 3/2007 | Armstrong |
| 2007/0061384 A1 | 3/2007 | Harrington et al. |
| 2007/0067297 A1 | 3/2007 | Kublickis |
| 2007/0073748 A1 | 3/2007 | Barney |
| 2007/0130112 A1* | 6/2007 | Lin ..................... G06F 17/3002 707/E17.009 |
| 2007/0136116 A1 | 6/2007 | Germeraad et al. |
| 2007/0174041 A1* | 7/2007 | Yeske ................ G06F 17/2785 704/3 |

(56) References Cited

U.S. PATENT DOCUMENTS

| | | | |
|---|---|---|---|
| 2007/0198578 A1 | 8/2007 | Lundberg et al. |
| 2007/0208669 A1 | 9/2007 | Rivette et al. |
| 2007/0208719 A1 | 9/2007 | Tran |
| 2007/0288256 A1 | 12/2007 | Speier |
| 2008/0005103 A1 | 1/2008 | Ratcliffe et al. |
| 2008/0016069 A1 | 1/2008 | Holt |
| 2008/0077570 A1 | 3/2008 | Tang et al. |
| 2008/0104032 A1 | 5/2008 | Sarkar |
| 2008/0154848 A1 | 6/2008 | Haslam et al. |
| 2008/0195601 A1 | 8/2008 | Ntoulas et al. |
| 2008/0216013 A1 | 9/2008 | Lundberg et al. |
| 2008/0306952 A1 | 12/2008 | Lynn et al. |
| 2009/0083049 A1 | 3/2009 | Sciarrino et al. |
| 2009/0157717 A1 | 6/2009 | Palahnuk et al. |
| 2009/0228578 A1 | 9/2009 | Demers et al. |
| 2009/0259459 A1 | 10/2009 | Ceusters et al. |
| 2009/0282054 A1 | 11/2009 | Casey |
| 2010/0005094 A1 | 1/2010 | Poltorak |
| 2010/0023386 A1 | 1/2010 | Avisar et al. |
| 2010/0082395 A1 | 4/2010 | De Andrade |
| 2010/0131513 A1 | 5/2010 | Lundberg et al. |
| 2010/0174698 A1 | 7/2010 | Odland et al. |
| 2010/0235337 A1 | 9/2010 | Shanahan et al. |
| 2011/0029476 A1 | 2/2011 | Kasravi et al. |
| 2011/0055192 A1 | 3/2011 | Tang et al. |
| 2011/0072014 A1 | 3/2011 | Lundberg et al. |
| 2011/0099084 A1 | 4/2011 | Horn et al. |
| 2011/0153509 A1 | 6/2011 | Lundberg et al. |
| 2011/0179032 A1 | 7/2011 | Ceusters et al. |
| 2011/0231449 A1 | 9/2011 | Ashley et al. |
| 2011/0246473 A1 | 10/2011 | Stec |
| 2011/0289096 A1 | 11/2011 | Barney |
| 2011/0320582 A1 | 12/2011 | Lewis |
| 2012/0096027 A1 | 4/2012 | Coult |
| 2012/0109642 A1 | 5/2012 | Stobbs et al. |
| 2012/0116989 A1 | 5/2012 | Lai et al. |
| 2012/0130993 A1 | 5/2012 | Lundberg et al. |
| 2012/0174017 A1 | 7/2012 | Tidwell et al. |
| 2012/0240026 A1 | 9/2012 | Iyer et al. |
| 2012/0284199 A1 | 11/2012 | Lundberg |
| 2013/0086045 A1 | 4/2013 | Lundberg |
| 2013/0086070 A1 | 4/2013 | Lundberg |
| 2013/0144895 A1 | 6/2013 | Cameron |
| 2013/0282409 A1 | 10/2013 | Lundberg et al. |
| 2013/0282571 A1 | 10/2013 | Lundberg |
| 2013/0346116 A1 | 12/2013 | Lundberg |
| 2013/0346265 A1 | 12/2013 | Lundberg |
| 2013/0346323 A1 | 12/2013 | Lundberg |
| 2013/0346505 A1 | 12/2013 | Lundberg |
| 2014/0379388 A1 | 12/2014 | Lundberg et al. |
| 2015/0134549 A1 | 5/2015 | Lundberg et al. |

FOREIGN PATENT DOCUMENTS

| | | |
|---|---|---|
| EP | 0638870 A1 | 2/1995 |
| GB | 2156112 A | 10/1985 |
| GB | 2260007 A | 3/1993 |
| WO | WO-98/16890 A1 | 4/1998 |
| WO | WO-02/080039 A1 | 10/2002 |
| WO | WO-2006/015110 A2 | 2/2006 |
| WO | WO-2006/015110 A3 | 2/2006 |
| WO | WO-2006/128183 A2 | 11/2006 |
| WO | WO-2006/128183 A3 | 11/2006 |
| WO | WO-2007014341 A2 | 2/2007 |
| WO | WO-2007014341 A3 | 2/2007 |
| WO | WO-2007014341 C2 | 2/2007 |

OTHER PUBLICATIONS

William A. Woods—"Conceptual Indexing: A Better Way to Organize Knowledge"—Technical Report Conceptual Indexing: A Better Way to Organize Knowledge, 1997—pp. 1-99.*

"U.S. Appl. No. 10/710,656, Non Final Office Action mailed Jan. 17, 2007", 16 pgs.

"U.S. Appl. No. 10/710,656, Response filed Nov. 13, 2006 to Restriction Requirement mailed Oct. 13, 2006", 6 pgs.

"U.S. Appl. No. 10/710,656, Restriction Requirement mailed Oct. 13, 2006", 9 pgs.

"U.S. Appl. No. 10/915,265, Advisory Action mailed Jul. 31, 2008", 3 pgs.

"U.S. Appl. No. 10/915,265, Final Office Action mailed Jul. 10, 2007", 26 pgs.

"U.S. Appl. No. 10/915,265, Final Office Action mailed Jul. 14, 2008", 23 pgs.

"U.S. Appl. No. 10/915,265, Non Final Office Action mailed Jan. 22, 2007", 15 pgs.

"U.S. Appl. No. 10/915,265, Non-Final Office Action mailed Apr. 13, 2009", 27 pgs.

"U.S. Appl. No. 10/915,265, Non-Final Office Action mailed Jun. 2, 2010", 29 pgs.

"U.S. Appl. No. 10/915,265, Non-Final Office Action mailed Nov. 5, 2008", 27 pgs.

"U.S. Appl. No. 10/915,265, Non-Final Office Action mailed Dec. 28, 2007", 25 pgs.

"U.S. Appl. No. 10/915,265, Response filed Feb. 5, 2009 to Non-Final Office Action mailed Nov. 5, 2008", 11 pgs.

"U.S. Appl. No. 10/915,265, Response filed Apr. 28, 2008 to Non-Final Office Action mailed Dec. 28, 2007", 14 pgs.

"U.S. Appl. No. 10/915,265, Response filed May 18, 2007 to Noon Final Office Action mailed Jan. 22, 2007", 9 pgs.

"U.S. Appl. No. 10/915,265, Response filed Jul. 18, 2008 to Final Office Action mailed Jul. 14, 2008", 17 pgs.

"U.S. Appl. No. 10/915,265, Response filed Sep. 1, 2010 to Non Final Office Action mailed Jun. 2, 2010", 12 pgs.

"U.S. Appl. No. 10/915,265, Response filed Oct. 10, 2007 to Final Office Action filed Jul. 10, 2007", 15 pgs.

"U.S. Appl. No. 10/915,265, Response filed Nov. 13, 2006 to Restriction Requirement mailed Oct. 11, 2006", 5 pgs.

"U.S. Appl. No. 10/915,265, Restriction Requirement mailed Oct. 13, 2006", 10 pgs.

"U.S. Appl. No. 11/494,278, Final Office Action mailed Mar. 23, 2009", 21 pgs.

"U.S. Appl. No. 11/494,278, Final Office Action mailed Apr. 1, 2010", 20 pgs.

"U.S. Appl. No. 11/494,278, Non Final Office Action mailed Oct. 8, 2009", 21 pgs.

"U.S. Appl. No. 11/494,278, Non-Final Office Action mailed Mar. 5, 2008", 14 pgs.

"U.S. Appl. No. 11/494,278, Notice of Allowance mailed May 3, 2011", 12 pgs.

"U.S. Appl. No. 11/494,278, Notice of Allowance mailed Dec. 15, 2011", 14 pgs.

"U.S. Appl. No. 11/494,278, Notice of Non-Compliant Amendment mailed Jun. 7, 2010", 2 pgs.

"U.S. Appl. No. 11/494,278, Preliminary Amendment filed Oct. 30, 2007", 6 pgs.

"U.S. Appl. No. 11/494,278, Response filed Feb. 10, 2010 to Non Final Office Action mailed Oct. 8, 2009", 8 pgs.

"U.S. Appl. No. 11/494,278, Response filed Jun. 2, 2010 to Final Office Action mailed Apr. 1, 2010", 7 pgs.

"U.S. Appl. No. 11/494,278, Response filed Jun. 5, 2008 to Non-Final Office Action mailed Mar. 5, 2008", 12 pgs.

"U.S. Appl. No. 11/494,278, Response filed Jun. 9, 2010 to Notice of Non-Compliant Amendment mailed Jun. 7, 2010", 7 pgs.

"U.S. Appl. No. 11/494,278, Response filed Jun. 23, 2009 to Final Office Action mailed Mar. 23, 2009", 8 pgs.

"U.S. Appl. No. 11/888,632, Amendment filed Jun. 12, 2012", 8 pgs.

"U.S. Appl. No. 11/888,632, Appeal Brief filed Jun. 4, 2015", 16 pgs.

"U.S. Appl. No. 11/888,632, Decision on Pre-Appeal Brief mailed Mar. 9, 2012", 2 pgs.

"U.S. Appl. No. 11/888,632, Final Office Action mailed Sep. 8, 2014", 12 pgs.

"U.S. Appl. No. 11/888,632, Non Final Office Action mailed Jan. 24, 2014", 12 pgs.

(56) References Cited

OTHER PUBLICATIONS

"U.S. Appl. No. 11/888,632, Pre-Appeal Brief Request filed Feb. 21, 2012", 4 pgs.
"U.S. Appl. No. 11/888,632, Response filed Jun. 24, 2014 to Non Final Office Action mailed Jan. 24, 2014", 9 pgs.
"U.S. Appl. No. 11/888,632, Response filed Jul. 19, 2011 to Non Final Office Action mailed Jan. 19, 2011", 8 pgs.
"U.S. Appl. No. 11/888,632, Final Office Action mailed Oct. 19, 2011", 9 pgs.
"U.S. Appl. No. 11/888,632, Non Final Office Action mailed Jan. 19, 2011", 12 pgs.
"U.S. Appl. No. 11/888,632, Response filed Dec. 7, 2010, to Restriction Requirement mailed Jul. 7, 2010", 7 pgs.
"U.S. Appl. No. 11/888,632, Restriction Requirement mailed Jul. 7, 2010", 5 pgs.
"U.S. Appl. No. 11/915,718, Advisory Action mailed Feb. 15, 2012", 3 pgs.
"U.S. Appl. No. 11/915,718, Final Office Action mailed Dec. 30, 2011", 13 pgs.
"U.S. Appl. No. 11/915,718, Non Final Office Action mailed May 26, 2011", 9 pgs.
"U.S. Appl. No. 11/915,718, Non Final Office Action mailed Jul. 7, 2014", 17 pgs.
"U.S. Appl. No. 11/915,718, Notice of Non-Compliant Amendment mailed Oct. 6, 2011", 2 pgs.
"U.S. Appl. No. 11/915,718, Preliminary Amendment filed Nov. 27, 2007", 2 pgs.
"U.S. Appl. No. 11/915,718, Response filed Feb. 8, 2012 to Final Office Action mailed Dec. 30, 2011", 13 pgs.
"U.S. Appl. No. 11/915,718, Response filed Oct. 11, 2011 to Notice of Non-Compliant Amendment mailed Oct. 6, 2011", 4 pgs.
"U.S. Appl. No. 11/915,718, Response filed Sep. 16, 2011 to Non Final Office Action mailed May 26, 2011", 9 pgs.
"U.S. Appl. No. 12/605,030, Final Office Action mailed May 21, 2012", 10 pgs.
"U.S. Appl. No. 12/605,030, Final Office Action mailed Jul. 16, 2014", 16 pgs.
"U.S. Appl. No. 12/605,030, Non Final Office Action mailed Nov. 7, 2013", 16 pgs.
"U.S. Appl. No. 12/605,030, Response filed Feb. 7, 2012 to Non Final Office Action mailed Oct. 7, 2011", 9 pgs.
"U.S. Appl. No. 12/605,030, Response Filed May 7, 2014 to Non Final Office Action mailed Nov. 7, 2013", 8 pgs.
"U.S. Appl. No. 12/605,030, Response filed Oct. 22, 2012 to Final Office Action mailed May 21, 2012", 8 pgs.
"U.S. Appl. No. 12/605,030, Non Final Office Action mailed Oct. 7, 2011", 12 pgs.
"U.S. Appl. No. 12/958,113, Examiner Interview Summary mailed Aug. 24, 2015", 2 pgs.
"U.S. Appl. No. 12/958,113, Non Final Office Action mailed Feb. 4, 2016", 25 pgs.
"U.S. Appl. No. 12/958,113, Non Final Office Action mailed Aug. 20, 2015", 25 pgs.
"U.S. Appl. No. 12/958,113, Response filed May 3, 2016 to Non Final Office Action mailed Feb. 4, 2016", 11 pgs.
"U.S. Appl. No. 12/958,113, Response filed Nov. 6, 2015 to Non Final Office Action mailed Aug. 20, 2015", 12 pgs.
"U.S. Appl. No. 12/658,113, Non Final Office Action mailed Feb. 28, 2011", 26 pgs.
"U.S. Appl. No. 12/958,113, Final Office Action mailed Aug. 8, 2011", 26 pgs.
"U.S. Appl. No. 12/958,113, Final Office Action mailed Nov. 3, 2014", 25 pgs.
"U.S. Appl. No. 12/958,113, Non Final Office Action mailed Apr. 30, 2014", 21 pgs.
"U.S. Appl. No. 12/958,113, Response filed Feb. 3, 2015 to Final Office Action mailed Nov. 3, 2014", 11 pgs.
"U.S. Appl. No. 12/958,113, Response filed Feb. 8, 2012 to Final Office Action mailed Aug. 8, 2011", 12 pgs.
"U.S. Appl. No. 12/958,113, Response filed May 20, 2011 to Non Final Office Action mailed Feb. 28, 2011", 13 pgs.
"U.S. Appl. No. 12/958,113, Response filed Jul. 16, 2014 to Non Final Office Action mailed Apr. 30, 2014", 12 pgs.
"U.S. Appl. No. 13/253,936, Appeal Brief filed Jan. 8, 2016", 10 pgs.
"U.S. Appl. No. 13/253,936, Non Final Office Action mailed Oct. 8, 2015", 15 pgs.
"U.S. Appl. No. 13/253,936, Appeal Brief filed Jun. 8, 2015", 13 pgs.
"U.S. Appl. No. 13/253,936, Final Office Action mailed Feb. 4, 2015", 14 pgs.
"U.S. Appl. No. 13/253,936, Final Office Action mailed Jun. 24, 2013", 13 pgs.
"U.S. Appl. No. 13/253,936, Non Final Office Action mailed Jun. 18, 2014", 14 pgs.
"U.S. Appl. No. 13/253,936, Non Final Office Action mailed Nov. 28, 2012", 11 pgs.
"U.S. Appl. No. 13/253,936, Response filed Mar. 27, 2013 to Non Final Office Action mailed Nov. 28, 2012", 11 pgs.
"U.S. Appl. No. 13/253,936, Response filed Dec. 16, 2014 to Non Final Office Action mailed Jun. 18, 2014", 9 pgs.
"U.S. Appl. No. 13/253,936, Response filed Dec. 23, 2013 to Final Office Action mailed Jun. 24, 2013", 5 pgs.
"U.S. Appl. No. 13/253,941, Final Office Action mailed Jun. 6, 2013", 16 pgs.
"U.S. Appl. No. 13/253,941, Final Office Action mailed Dec. 26, 2014", 18 pgs.
"U.S. Appl. No. 13/253,941, Non Final Office Action mailed May 7, 2014", 18 pgs.
"U.S. Appl. No. 13/253,941, Non Final Office Action mailed Nov. 15, 2012", 14 pgs.
"U.S. Appl. No. 13/253,941, Response filed Apr. 15, 2013 to Non Final Office Action mailed Nov. 15, 2012", 13 pgs.
"U.S. Appl. No. 13/253,941, Response filed Nov. 6, 2013 to Final Office Action mailed Jun. 6, 2013", 11 pgs.
"U.S. Appl. No. 13/253,941, Response filed Nov. 7, 2014 to Non Final Office Action mailed May 7, 2014", 10 pgs.
"U.S. Appl. No. 13/365,062, Non Final Office Action mailed Mar. 19, 2015", 14 pgs.
"U.S. Appl. No. 13/365,062, Non Final Office Action mailed Apr. 30, 2014", 13 pgs.
"U.S. Appl. No. 13/365,062, Non Final Office Action mailed Jul. 3, 2012", 20 pgs.
"U.S. Appl. No. 13/365,062, Non Final Office Action mailed Aug. 19, 2013", 14 pgs.
"U.S. Appl. No. 13/365,062, Non Final Office Action mailed Oct. 9, 2014", 13 pgs.
"U.S. Appl. No. 13/365,062, Non Final Office Action mailed Nov. 30, 2012", 19 pgs.
"U.S. Appl. No. 13/365,062, Notice of Allowance mailed Jul. 24, 2015", 11 pgs.
"U.S. Appl. No. 13/365,062, Response filed Feb. 9, 2015 to Non Final Office Action mailed Oct. 9, 2014", 6 pgs.
"U.S. Appl. No. 13/365,062, Response filed May 29, 2013 to Non Final Office Action mailed Nov. 30, 2012", 8 pgs.
"U.S. Appl. No. 13/365,062, Response filed Jun. 19, 2015 to Non Final Office Action mailed Mar. 19, 2015", 9 pgs.
"U.S. Appl. No. 13/365,062, Response filed Sep. 2, 2014 to Non Final Office Action mailed Jul. 30, 2014", 8 pgs.
"U.S. Appl. No. 13/365,062, Response filed Oct. 3, 2012 to Non Final Office Action mailed Jul. 3, 2012", 8 pgs.
"U.S. Appl. No. 13/365,062, Response filed Dec. 19, 2013 to Non Final Office Action mailed Aug. 19, 2013", 10 pgs.
"U.S. Appl. No. 13/464,598, Examiner Interview Summary mailed May 1, 2014", 3 pgs.
"U.S. Appl. No. 13/464,598, Non Final Office Action mailed Mar. 16, 2015", 51 pgs.
"U.S. Appl. No. 13/464,598, Non Final Office Action mailed Dec. 4, 2013", 26 pgs.
"U.S. Appl. No. 13/464,598, Response filed Apr. 5, 2014 to Non-Final Office Action mailed Dec. 4, 2013", 44 pgs.

(56) References Cited

OTHER PUBLICATIONS

"U.S. Appl. No. 13/464,598, Appeal Brief filed Jan. 28, 2016", 19 pgs.
"U.S. Appl. No. 13/464,598, Final Office Action mailed Jul. 28, 2015", 38 pgs.
"U.S. Appl. No. 13/464,598, Response filed Jul. 16, 2015 to Non Final Office Action mailed Mar. 16, 2015", 24 pgs.
"U.S. Appl. No. 13/573,803, Final Office Action mailed Apr. 7, 2015", 16 pgs.
"U.S. Appl. No. 13/573,803, Non Final Office Action mailed Sep. 15, 2014", 15 pgs.
"U.S. Appl. No. 13/573,803, Non Final Office Action mailed Dec. 5, 2013", 16 pgs.
"U.S. Appl. No. 13/573,803, Response filed Jun. 5, 2014 to Non Final Office Action mailed Dec. 5, 2013", 12 pgs.
"U.S. Appl. No. 13/573,803, Response filed Dec. 15, 2014 to Non Final Office Action mailed Sep. 15, 2014", 12 pgs.
"U.S. Appl. No. 13/573,804, Final Office Action mailed Mar. 23, 2015", 16 pgs.
"U.S. Appl. No. 13/573,804, Non Final Office Action mailed Oct. 20, 2014", 15 pgs.
"U.S. Appl. No. 13/573,804, Response filed Jan. 20, 2015 to Non Final Office Action mailed Oct. 20, 2014", 15 pgs.
"U.S. Appl. No. 13/573,804, Response filed Aug. 29, 2014 to Restriction Requirement mailed Jun. 30, 2014", 8 pgs.
"U.S. Appl. No. 13/573,804, Restriction Requirement mailed Jun. 30, 2014", 5 pgs.
"U.S. Appl. No. 14/010,376, Final Office Action mailed Aug. 19, 2015", 13 pgs.
"U.S. Appl. No. 14/010,376, Non Final Office Action mailed Mar. 24, 2015", 10 pgs.
"U.S. Appl. No. 14/010,376, Response filed Jun. 24, 2015 to Non Final Office Action mailed Mar. 24, 2015", 10 pgs.
"U.S. Appl. No. 14/010,380, Final Office Action mailed Oct. 6, 2015", 11 pgs.
"U.S. Appl. No. 14/010,380, Non Final Office Action mailed Apr. 15, 2015", 11 pgs.
"U.S. Appl. No. 14/010,380, Response filed Aug. 17, 2015 to Non Final Office Action mailed Apr. 15, 2015", 11 pgs.
"U.S. Appl. No. 14/010,391, Final Office Action mailed Sep. 15, 2015", 11 pgs.
"U.S. Appl. No. 14/010,391, Non Final Office Action mailed Mar. 23, 2015", 11 pgs.
"U.S. Appl. No. 14/010,391, Response filed Jul. 22, 2015 to Non Final Office Action mailed Mar. 23, 2015", 10 pgs.
"U.S. Appl. No. 14/010,400, Final Office Action mailed Sep. 10, 2015", 9 pgs.
"U.S. Appl. No. 14/010,400, Non Final Office Action mailed Apr. 22, 2015", 11 pgs.
"U.S. Appl. No. 14/010,400, Response filed Jul. 22, 2015 to Non Final Office Action mailed Apr. 22, 2015", 10 pgs.
"U.S. Appl. No. 14/483,903, Non Final Office Action mailed Sep. 1, 2015", 10 pgs.
"U.S. Appl. No. 14/536,320, Non Final Office Action mailed Mar. 25, 2015", 9 pgs.
"U.S. Appl. No. 14/750,559, Preliminary Amendment filed Jun. 26, 2015 ", 9 pgs.
"Australian Application Serial No, 2006272510, Office Action mailed Oct. 22, 2010", 3 pgs.
"Australian Application Serial No. 2006272510, Response filed Oct. 6, 2011 to Office Action mailed Oct. 22, 2011", 15 pgs.
"Australian Application Serial No. 2012200701, Office Action mailed Aug. 21, 2013", 2 pgs.
"Australian Application Serial No. 2012200701, Response filed Dec. 12, 2013 to Office Action mailed Aug. 21, 2013", 33 pgs.
"Australian Application Serial No. 2013270518, Response filed May 25, 2016 to Subsequent Examiners Report mailed Feb. 1, 2016", 13 pgs.
"Australian Application Serial No. 2013270518, Subsequent Examiners Report mailed Feb. 1, 2016", 2 pgs.
"Australian Application Serial No. 2013270518, Subsequent Examiners Report mailed Jun. 7, 2016", 2 pgs.
"Casefinder Manual", [online]. [archived on Apr. 19, 2004]. Retrieved from the Internet: <URL: http://web.archive.org/ web/20040419155315/http://www.casefinder.com/downloads/manual-5.00.pdf>, (2004), 2, 35-42, 51.
"East Text Search Training", (Jan. 2000), 155 pgs.
"European Application Serial No. 05775617.3, Extended European Search Report mailed Mar. 24, 2009", 8 pgs.
"European Application Serial No. 06800464.7, Amendment filed Mar. 21, 2011", 7 pgs.
"European Application Serial No. 06800464.7, Examination Notification Art. 94(3) mailed May 2, 2014", 8 pgs.
"European Application Serial No. 06800464.7, Extended European Search Report mailed Aug. 24, 2010", 8 pgs.
"European Application Serial No. 06800464.7, Response filed Sep. 11, 2014 to Office Action mailed May 2, 2014", 16 pgs.
"International Application Serial No. PCT/US2005/026768, Demand mailed Mar. 7, 2007", 9 pgs.
"International Application Serial No. PCT/US2005/026768, International Preliminary Report on Patentability mailed Mar. 29, 2007", 8 pgs.
"International Application Serial No. PCT/US2005/026768, International Search Report mailed Mar. 7, 2007", 5 pgs.
"International Application Serial No. PCTIUS2005/026768, Written Opinion mailed Mar. 7, 2007", 5 pgs.
"International Application Serial No. PCT/US2006/020950, International Preliminary Report on Patentability mailed Dec. 13, 2007", 6 pgs.
"International Application Serial No. PCT/US2006/020950, International Search Report mailed Feb. 5, 2007", 2 pgs.
"International Application Serial No. PCT/US2006/020950, Written Opinion mailed Feb. 5, 2007", 4 pgs.
"International Application Serial No. PCT/US2006/029456, International Preliminary Report on Patentability mailed Feb. 7, 2008", 9 pgs.
"International Application Serial No. PCT/US2006/029456, International Search Report mailed Oct. 1, 2007", 5 pgs.
"International Application Serial No. PCT/US2006/029456, Written Opinion mailed Oct. 1, 2007", 7 pgs.
"International Search Report and Written Opinion in PCT/US05/26768, mailed Mar. 7, 2007", 15 pgs.
"Notice from the European Patent Office dated Oct. 1, 2007 concerning business methods", Official Journal of the European Patent Office, 30(11), (Nov. 1, 2007), 592-593.
"PatentPleeze Overview", [Online]. Retrieved from the Internet: <URL: http://web.archive.org/web/20060824063540//web.ncf.ca/ex133/patnow.pdf>, (Archived Aug. 24, 2006), 33 pgs.
"Using Citation Link", [Online]. Retrieved from the Internet: <URL: http://web.archive.org/web/20041204224023/www.delphion.com/help/citelink_help>, (Archived Dec, 4, 2004), 10 pgs.
"What is Pair?", [Online], Retrieved from the Internet: <URL: http://web.archive.org/web/20040606224528/pair.uspto.gov/cgi-bin/final/help.pl>, (Archived Jun. 6, 2004), 9 pgs.
Broekstra, Joen, et al., "Sesame: A Generic Architecture for Storing and Querying RDF and RDF Schema", Administrator Nederland b.v., Amersfoort, The Netherlands; Faculty of Sciences, Vrije University, Amsterdam, The Netherlands, http://www.aidministrator.nl/, (2002), 16 pgs.
Chang, Muchiu, "Sun Tzu and sustainable competitive advantage", Published in :Engineering Management Conference,2004. Proceedings. 2004 IEEE International (vol. 1), (Oct. 18-21, 2004), 153-157.
Davis, Lee, "The Strategic Use of Patents in International Business", The 28th Annual EIBA Conference, Athens Greece, (Dec. 2002), 1-27.
East, T. W, "Patent Claims—How to Keep Track of Them", IEEE Aerospace and Electronic Systems Magazine, 10(8), (Aug. 1995), 32-33.
Fall, C.J., et al., "Literature Survey: Issue to be considered in the automatic classifications of patents", World Intellectual Property Organization, (Oct. 2002), 1-64.

(56) References Cited

OTHER PUBLICATIONS

Gruber, T R, et al., "A Translation Approach to Portable Ontology Specifications", KSL Report KSL-92-71, Knowledge Systems Laboratory, Stanford University, (1993), 24 pgs.

Hoover, A. E. "Electronic Filing Top 10 Wish List,' IP Today", pp. 22-23, (Jul. 2006), 2 pgs.

Hutzell, Paula, USPTO PPT Presentation, (May 8, 2003), 25 pgs.

Indukuri, Kishore Varma, et al., "Similarity Analysis of Patent Claims Using Natural Language Processing Techniques", International Conference on Computational Intelligence and Multimedia Applications, (2007), 169-175.

Langan-Fox, Janice, "Team Mental Models: Techniques, Methods, and Analytic Approaches", The Journal of the Human Factors and Ergonomics Society Summer 2000 vol. 42 No. 2, (2000), 242-271.

Larkey, L. 5, "A Patent Search and Classification System", Proceedings of the 4th ACM Conference of Digital Libraries, (1999), 179-187.

Larkey, Leah 5, et al., "Collection Selection and Results Merging with Topically Organized U.S. Patents and TREC Data", Proceedings of the ninth international conference on Information and knowledge management, (2000), 8 pgs.

Luo, Si, et al., "A Semisupervised Learning Method to Merge Search Engine results", ACM Transactions on Information Systems, vol. 21, No. 4, (Oct. 2002), 457-491.

Mahesh, K., "Ontology Development for Machine Translation: Ideology and Methodology", Technical Report MCCS-96-292, Computing Research Laboratory, New Mexico State University, (1996), 87 pgs.

Mase, H., et al., "Proposal of Two-Stage Patent Retrieval Method Considering the Claim Structure", ACM Transactions on Asian Language Information Processing (TALIP), 4(2), (Jun. 2005), 190-206.

Quinn, B., "Internet Access to Patent Application Files Now Available", Press Release, [online]. [archived on Aug. 13, 2004]. Retrieved from the Internet: <URL: http://web.archive.org/web/20040813210925/http://www.uspto.gov/web/offices/com/speeches/04-13.htm>, (Aug. 2, 2004), 1 pg.

Sheremetyeva, S., et al., "Generating Patent Claims from Interactive Input", Proceedings of the 8th International Workshop on Natural Language Generation (INLG'96), (Jun. 1996), 61-70.

Sheremetyeva, S., et al., "Knowledge Elicitation for Authoring Patent Claims", IEEE Computer, 29(7), (Jul. 1996), 57-63.

Sheremetyeva, S., "Natural Language Analysis of Patent Claims", Proceedings of the ACL-2003 Workshop on Patent Corpus Processing, (2003), 66-73.

Sheremetyeva, S., et al., "On Creating Metadata with Authoring Tools", Proceedings of the ECAI 2002 Workshop on Semantic Authoring, Annotation and Knowledge Markup(SAAKM), (Jul. 2002), 22-26.

Von-Wun, Soo, et al., "A Cooperative Multi-Agent Platform for Invention based on Ontology and Patent Document Analysis", The 9th International Conference on Computer Supported Cooperative Work in Design Proceedings, (2005), 411-416.

Woods, W. A. "Conceptual Indexing: A Better Way to Organize Knowledge", Sun Microsystems, Inc., (1997), 99 pgs.

U.S. Appl. No. 10/710,656, filed Jul. 27, 2004, Patent Mapping.

U.S. Appl. No. 10/915,265, filed Aug. 10, 2004, Patent Mapping.

U.S. Appl. No. 12/958,113, filed Dec. 1, 2010, Patent Mapping.

U.S. Appl. No. 13/253,936, filed Oct. 5, 2011, Patent Mapping.

U.S. Appl. No. 13/253,941, filed Oct. 5, 2011, Prior Art Management.

U.S. Appl. No. 13/464,598, filed May 4, 2012, Apparatus and Method For Automated and Assisted Patent Claim Mapping and Expense Planning.

* cited by examiner

*FIG. 7C*

PATENT MAPPING

RELATED APPLICATIONS

This application is related and claims priority to and is a continuation of U.S. patent application Ser. No. 13/365,062, filed Feb. 2, 2012, and issued as U.S. Pat. No. 9,201,956, which is related and claims priority to and is a continuation of U.S. patent application Ser. No. 11/494,278, filed Jul. 27, 2006, and issued as U.S. Pat. No. 8,161,025, entitled "Patent Mapping," by Steven W. Lundberg, Janal M. Kalis, and Pradeep Sinha, which are incorporated herein by reference, and is related to further applications, to which priority is claimed, as follows: This application is also related to and claims the priority of U.S. Provisional Patent Application Ser. No. 60/703,413, entitled "Patent Mapping," by Steven W. Lundberg, Janal M. Kalis, and Pradeep Sinha, filed Jul. 27, 2005, which is incorporated herein by reference; and is further related to U.S. patent application Ser. No. 10/710,656, entitled "Patent Mapping," by Steven W. Lundberg, Janal M. Kalis, and Pradeep Sinha, filed Jul. 27, 2004 which is incorporated herein by reference and corresponding PCT application PCT/US2005/026768 filed Jul. 27, 2005; and U.S. patent application Ser. No. 10/915,265, entitled "Patent Mapping," by Steven W. Lundberg, Janal M. Kalis, and Pradeep Sinha, filed Aug. 10, 2004 which is incorporated herein by reference.

FIELD

This application relates to patent mapping and more particularly to systems, software, methods and data structures for patent mapping.

BACKGROUND

Tools for identifying patents for a particular purpose such as a prior art search, validity analysis, or a freedom to operate investigation, operate by performing Boolean queries using various search operators. These operators allow for searching by date, terms, document number, and patent classification, among others. These tools further allow for searching individual document portions such as a document title, abstract, or claim set.

Other searching tools accept freeform text. Such tools accept a freeform text block and extract information from the text block deemed most likely to return acceptable results. However, such tools are still limited to only performing Boolean queries and displaying a list of results.

These search tools often provide large numbers of results, most of which are irrelevant. These tools fail to present results in a manner allowing for quick relevancy determinations. The presentation also fails to provide enough detail suggesting how to adjust a search for obtaining only relevant results. Further, the search tools provide the documents of the result set in a manner very similar to the traditional paper format of the documents.

BRIEF DESCRIPTION OF THE DRAWINGS

FIG. 7A-FIG. 7G illustrate user interfaces of example embodiments.

DESCRIPTION

Figure 1:
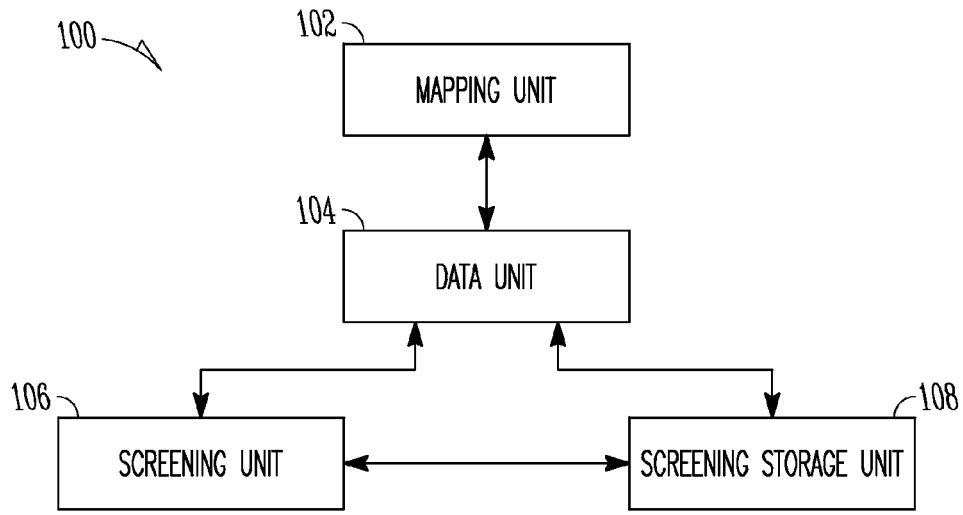
FIG. 1 is a functional block diagram of one example embodiment.

The subject matter herein provides systems, software, methods, and data structures for patent mapping, searching, and display to quicken analysis of patent documents for virtually any purpose. Various example embodiments of the described subject matter assist practitioners in producing higher quality work product by reducing irrelevant search results, leaving more time and money to focus on the more important analysis. Some further embodiments assist in analysis by interweaving patent documents and linking various portions of individual patent documents with other portions of the same document. Yet further embodiments assist in analyzing patent documents by identifying similarities and differences between one or more patent documents or portions thereof.

In the following detailed description, reference is made to the accompanying drawings that form a part hereof, and in which are shown by way of illustration specific embodiments in which the inventive subject matter can be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

The subject matter herein, in one example embodiment is useful to conduct a patent clearance study to clear a large number of components and assemblies of interest or other subject matter and technology that may be subject to patent protection in one or more countries. Such a large scale clearance project presents a number of challenges and opportunities.

When performing such a study of a large number of patent documents, such as United States and foreign patents and patent applications, the same patent documents need to be screened many times against a wide range of assemblies and components. This can lead to considerable wasted effort unless a well structured approach is taken. Further, the sheer volume of the work creates a special incentive to devise a triage system of review, wherein as much of the work as possible can be done by the least expensive resources. Efficient methodologies of review can be implemented using the present subject matter to not only produce relevant results, but also to control cost.

Projects, such as patent clearance studies, often do not capture knowledge that can be re-used as a resource at a later point in time either within the parameters of the clearance study or for other purposes. Some embodiments provide a process and system that retains at least some of the knowledge gained through the study, in an accessible manner.

In the present example embodiment, a pool of patent documents to be mapped and screened is identified using various techniques. Some such techniques include identifying patent documents by assignee, patent class, keyword searches, inventor information such as name or city and state of residence, title, or other information within patent documents or other source of data related to patent documents. New patent documents can be added or subtracted from this pool while mapping is in progress, or at a later date when the patent pool or clearance study is updated.

In some embodiments, depending on the requirements of a patent clearance study, at least the independent claims of each patent document within the identified patent pool will be mapped using a computer system and software operating on the system. In some embodiments, the mapping includes assigning a reusable concept to a patent claim as a whole, termed the "claim concept," the claim concept being broad enough to encompass the broadest possible reading of the claim. For example, if the claim is directed to a dog with a red tail, the claim concept may be "dog," or a mapper may assign it to the claim concept "animal," depending on preferences, experience, breadth of the clearance study, or requirements. Further concepts may be mapped to claim elements or limitations. These concepts are termed "limitation concepts," and, in essence, define limits on the scope of the claim concept(s) assigned to a claim as a whole. For example, the limitation concept "red tail" may be mapped to the example claim. Or, the claim directed to a dog with a red tail may be mapped to both claim concepts "dog" and "animal," and a further concept "tail."

Further, claim concepts, or limitation concepts, may be arranged or structured in a hierarchical fashion, with multiple levels. For instance, the claim concept "dog" may be structured as a sub-concept of "animal." "Red tail" may be structured as a sub-concept of "tail."

In some embodiments, after the claim is mapped to one or more claim concepts, the limiting elements are mapped. These limitations are found in the preamble and/or body of claim. First, limitations of interest in the claim are identified. In some embodiments, not all limitations need be mapped. Limitations of interest may be highlighted, or otherwise selected or annotated. The highlighted limitations are then mapped, or associated, with one or more reusable limitation concepts kept in a concept catalog or index or other data structure. The catalog may also contain reusable claim concepts. If the catalog does not contain a suitable limitation concept to map to, a new limitation concept is added to the catalog "on the fly" or at a later time. Periodically the catalog is reviewed and similar claim or limitation concepts are merged together when possible to limit the size of the concept catalog. In some embodiments, a patent claim with one or two particularly narrow limitations may only require mapping of the one or two limitations to corresponding limitation concepts, in order to capture the most salient information concerning the claim's scope.

Within any given patent document there are often many claims with similar limitations. Once a claim is mapped in a given patent, the mapping software may analyze each successive claim chosen for mapping and suggest mappings based on the way the previous claim(s) in the patent document have been mapped. Automated suggestions may also be made using mappings established for claims in other patent documents. Using this tool, mapping is both greatly accelerated and also made more uniform. In some embodiments, suggested mappings are provided to a user via a user interface to approve, modify and approve, or delete.

In some embodiments, a screening tool is used to rule out patent documents that are not of interest to a target subject matter. A target subject matter to be screened, in various embodiments, includes any patentable subject matter, such as a method, apparatus, or composition of matter, whether actual or hypothetical. In some embodiments, the process of using the screening tool includes opening a screening activity data structure and identifying a target subject matter to be screened, for example, by typing in a description of the subject matter into a field or alternatively picking it from a preexisting list. A pool of patent documents to screen is also assembled or identified. Patent documents to be screened may be added to the pool based on such search criteria as one or more of assignee, patent classification, keyword, inventor or other data identifiable in a patent document, or by any other selection criteria. All these methods or others may be used to identify a pool of patent documents to screen the target subject matter against. Alternatively, in addition, one or more claim concepts in the catalog may be identified, such that the identified claim concepts are broad enough to cover the target subject matter. The one or more claim concepts may be used to create a pool of limitation concepts to be screened, wherein the claims mapped to these concepts are added to the pool. If claims are identified for screening based on a claim concept, then the parent patent document containing the identified claims may also be added to the pool. Alternatively, the pool may be formed only of claims to be screened and not necessarily every claim of any patent that has a claim in the pool.

The following embodiment assumes that a pool of patent documents is initially assembled for screening and in turn the pool of claims to be screened belong to these patent documents. The claim concepts or limitation concepts associated with the identified pool of patents (and associated claims to which the concepts are mapped) to be screened are assembled into a concept pool for use in screening the patent documents in view of the target subject matter. A screener then reviews the concepts in the concept pool, ruling out any concepts that are not found in the target subject matter. Concepts may be marked as "definitely not in target subject matter", "maybe in target subject matter", or "don't know." If a concept is marked "definitely not found in target subject matter", then any claim mapped to that concept may be ruled out. If desired, in a software implementation, multiple concepts may be required to be ruled "definitely not found" for any given claim to be ruled out.

In order to speed screening, the concepts in the pool being mapped may be reduced as follows. Once a concept is marked "definitely not in target subject matter", the screening software rules out all claims that are mapped to the eliminated concept. Any concepts that are solely mapped to the ruled out claims may then be marked "removed from consideration." Some embodiments also include annotating ruled out claims or concepts as to why the claims or concepts ruled out were removed (e.g., which claim was ruled out to eliminate them). This annotating is in a data structure related to the concept as it applies to the particular target subject matter being analyzed. In some such embodiments, annotations are stored in manner such that subsequent viewing of the annotation is restricted to a limited number of viewers, such as the author or members of the author's workgroup. Using this process, the pool of concepts to be reviewed is reduced both by the action of ruling out concepts and by the corresponding elimination of concepts removed from consideration. In one embodiment, claim concepts may be the first concepts screened, allowing for a "high level" elimination of claims. For example, if the claim concept "dog" is ruled out, then all claims mapped to this claim concept may be ruled out. In turn, all limitation concepts mapped solely to ruled out claims are also eliminated from consideration.

In some embodiments, once all concepts in the concept pool are reviewed, there are assorted outputs that are preferably kept in a data structure. The first output includes a record of the screening. The record of the screening includes marking each concept with a status, such as: "definitely not in target subject matter", "maybe in target subject matter", "don't know", or "removed from consideration." This record can be revisited, reviewed, or edited. The second output includes a list of claims that are not applicable to the target subject matter. For example, any claim ruled out is added to the list of claims that are not applicable to the subject of the target subject matter. This list flows from the status of each concept and in turn the claims the concept belongs to. The third output includes a list of patent documents that are not applicable to the target subject matter. Any patent document with all claims ruled out is added to this list of non-applicable patent documents. This list flows from the status of each claim within a parent patent. The third output includes a list of all claims that are not definitively ruled out in the screening process. The fourth output is a list of patent documents or claims not ruled out. This is a list of all patent documents that are not definitively ruled out in the screening process. There may also be a list of claims removed from consideration. These outputs may be presented as paper reports or as on-line reports, automatically generated emails or other electronic message type, or displays which allow a user to drill through the eliminated concepts, claims or patent documents, or to view the supporting patent specification or portions thereof for a ruled out or ruled in patent document.

Another output is specific to a patent or a family or other groups of patents. This output may be an index to the mapped claims in the patent or group. For instance, the index may list all mapped claim concepts and/or limitation concepts with applicable claim numbers indicated for each concept. Concepts appearing in all claims may be highlighted. Another output may be a hierarchy chart or diagram showing concept/sub-concept relationships. These outputs may be paper or online with interactive hyper-links to claims.

In some embodiments, mapping of patent documents and claims is semi-automated. In addition, mapping personnel can be trained to identify esoteric or narrow limitations in claims and map only those limitations. This reduces mapping time for inherently narrow patent claims. To screen out possibly applicable patent documents, the process only requires that limitations be mapped to a concept that is at least as broad as the limitation. It is not problematic that the mapping is to an overbroad concept because the screening process is intended only to eliminate patents or claims from consideration and not to positively identify patents that are infringed. Thus, these types of "false positives" are not a problem when using the tool, as the false positives can be ruled out by further review or study.

Screening can also be accomplished in reverse. That is, concepts applicable to the target subject matter can be identified as "present" or "maybe present." This process will identify potential claims that cover the target subject matter. However, this process would ideally require that all limitations in a claim be mapped accurately to concepts so as to not include a multitude of false positives or possibly false negatives.

In some embodiments, the software and systems are web-based and accessible with a user name and password. Subscribers to such systems and software may receive a license to use the software for an individual project, a period of time, or on a pay-per-access or pay-per-unit of time basis.

FIG. 1 shows a functional block diagram of one example embodiment. This example embodiment illustrates software 100 for mapping and searching for patent documents. In some embodiments, the patent documents include one or both of patents and published patent applications. In some embodiments, the patent documents include United States patent documents, while other embodiments include international patent documents. The software 100 for mapping these patent documents includes a mapping unit 102, a data unit 104, a searching unit 106, and a search storage unit 108.

In some embodiments of the software 100, the mapping unit 104, the searching unit 106, and the search storage unit 108 work with associations of data between various portions of patent documents. Some such associations include two limitation concepts associated with a concept that defines a relationship between limitation concepts, termed "relational concept." An example of such an association is, "A dog wags its tail." The two limitation concepts are "dog" and "tail." The relational concept is "wags." Some patent claims may contain many of such associations. For example, "A dog wags its tail that is brown." The first association is the same as before. The second association is between limitation concepts "tail" and "brown." The second relational concept is "is." "Is" in this context equates to "has color."

In one embodiment, any type of concept may have an associated definition. For instance, dog may be defined as a "canine species having four legs." As mentioned above, some claim concepts may be designated subordinate to other claim concepts, such as a processor concept that is subordinated to the concept of computers. In addition, a limitation concept may be designated as a subordinate concept to a claim concept or another limitation concept, for example, in a hierarchy. In some such embodiments, a subordinate concept can be designated as an inherent property of a concept. For instance, the limitation concept "head" may be designated an inherent property of "dog." In other embodiments, a concept definition includes various properties of the concept that are inherent, such as a personal computer concept having an inherent property of a housing encasing a number of components. Other embodiments include concepts that are descriptive or actions such as "storing data" or "electronic funds transfer." The "storing data" example might include a definition that encompasses databases, storage devices, or storage media. The "electronic funds transfer" might encompass banking, money, network, transfer, Federal Reserve, or EFS. Some embodiments of concept definitions include a glossary of words useful in identifying the concept.

In some embodiments, the mapping unit 102 operates to paraphrase one or more portions of patent claim elements or limitations, and map the paraphrase to a concept. In some embodiments, the paraphrased portion is a general idea derived from a claim that is implicit to the claim, but not explicitly stated in the claim. This paraphrasing in various embodiments includes mapping one or more concepts to a claim. In some such embodiments, a limitation concept is mapped to one or more claim limitations or elements. The mapping unit 102 then stores mapped patent documents and/or claims in the data unit 104. In some embodiments, a mapping utility is included in the mapping unit 102. This mapping utility extracts language from an unmapped patent claim and compares the extracted language against concept definitions and previously mapped patent claims to determine a likely mapping. In some such embodiments, the mapping utility makes a mapping recommendation through a user interface. In other embodiments, the utility operates in a batch mode and automatically maps patent claims.

In some embodiments, the data unit 104 operates to store output from the mapping unit 102 and provide data to the searching screening unit 106. The data unit 104 also stores data received from the search storage unit 108 and serves data to the search storage unit 108 when requested. In one such embodiment, the data unit 104 includes a database management system (DBMS) for storing and retrieving data. In some embodiments, the DBMS is a relational database management system (RDBMS). In some other embodiments, the data unit 104 includes storing data in a Resource Description Framework Schema (RDFS). In some embodiments, the various units communicate with the data unit 104 using a language such as Structured Query Language (SQL) or eXtensible Markup Language (XML).

The searching unit 106 includes tools for extracting patent data in a useful manner from the data unit 104. In some embodiments, the starting point for searching is the entire universe of patent documents in the data unit 104. Documents in this universe, or pool, are eliminated based on input by a searcher. In some embodiments, this input includes eliminating concepts from consideration. In some embodiments, when concepts are eliminated, patent claims or documents containing solely eliminated concepts are removed from the universe.

The storage unit 108 performs functions for storing and retrieving search results obtained by the screening unit 106 in the data unit 104. In some embodiments, storing the search results includes storing various parameters used in search including eliminated concepts, or even a list of specific documents excluded from a search. In other embodiments, a listing of identified patent documents is stored. Some such embodiments also store search parameters such as eliminated concepts.

Figure 2:
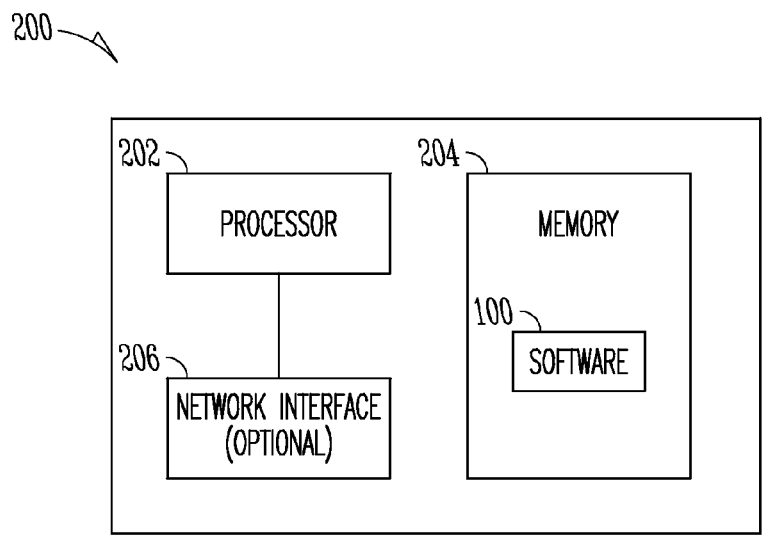
FIG. 2 is a system schematic diagram of one example embodiment.

FIG. 2 shows a schematic diagram of a system 200 according to one example embodiment. The system 200 includes a processor 202 and a memory 204 holding the software 100 (as shown in FIG. 1). Some embodiments of the system 200 include an optional network interface 206 for accessing a network during execution of the software 100. In some such networked embodiments, the system is a client/server system where various portions of the software 100 are distributed across a network for performing various tasks required by the software. In some other networked embodiments, the system is a web-based system with software distributed across a network, such as a local or wide area network, an intranet, or the Internet, with various portions of the software distributed across the network. In some such web-based systems, a client computer causes the software 100 to execute through interaction with the software 100 through a client user process such as a web browser.

In some embodiments, the processor 202 represents a central processing unit (CPU) of any type of architecture, such as a CISC (Complex Instruction Set Computing), RISC (Reduced Instruction Set Computing), VLIW (Very Long Instruction Word), or hybrid architecture, although any appropriate processor may be used. The processor 202 executes instructions, such as instructions contained within the software 100. In some other embodiments, the processor is a graphics processor on a video card. The processor 202 in these embodiments also includes a control unit that organizes data and program storage in memory 204 and transfers data and other information in and out of the system 200 and to and from a network over the network interface 206 and other devices attached to the network. Although the system 200 is shown to contain only a single processor 202, the present subject matter applies equally to systems 200 that include multiple processors 202 such as multiple CPUs, multiple graphics processors, and combinations of CPU and graphics processors.

The memory 204 of the system 200 holds the software 100 as illustrated in FIG. 1. The memory 204 represents one or more mechanisms for storing data. For example, the memory 204, in various embodiments, includes read only memory (ROM), random access memory (RAM), magnetic disk storage media, optical storage media, flash memory devices, and/or other volatile and non-volatile machine-readable media. In other embodiments, any appropriate type of storage device or memory 204 can be used. Although only one memory 204 is shown, multiple memories 204 and multiple types of storage devices can be present. In various embodiments, some or all of the software 100, or other items, can be stored on the same or on different memory 204 or storage devices. Furthermore, although the system 200 is drawn to contain the memory 204, the memory 204 or other storage device can be distributed across other systems 200 or computing devices operatively coupled to the system 200 over the network interface 206 such as by a network or other wired or wireless communication link such as a network.

Figure 3:
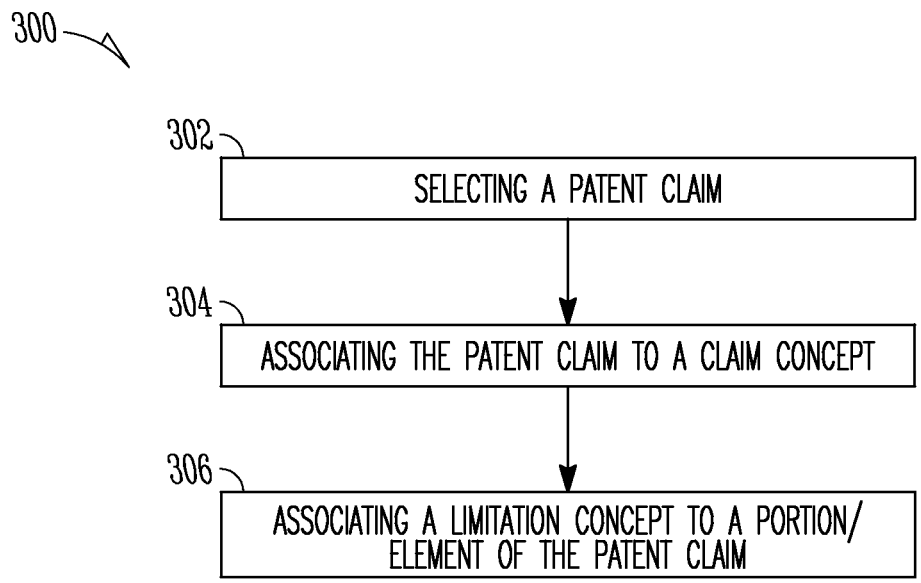
FIG. 3 is a method flow diagram of one example embodiment.

FIG. 3 is a method 300 flow diagram of one example embodiment. The method 300 of this embodiment includes selecting a patent claim 302, associating the patent claim to a claim concept 304, and associating the elements of the claim to one or more limitation concepts 306. Selecting a patent claim 302 includes selecting a claim from a patent document for mapping.

Associating the patent claim to a claim concept 304 includes assigning a concept designation to the claim as a whole. In other words, the claim concept will ideally have a scope that is at least as broad or broader than the scope of subject matter covered by the claim. Some embodiments provide the ability to assign multiple claim concepts to a claim. Associating a limitation concept to a portion or element of the patent claim 306 includes assigning the limitation concept to a portion of the claim such as a single limitation, a phrase, an element, an individual word within the claim, or a paraphrasing of the scope of one or more these portions. For example, consider a claim including the limitation, "a dog having a tail." The claim as a whole could be assigned to a claim concept "mammal" or "canine." The word "tail" could be assigned to a limitation concept "body part" or "appendage" or simply "tail." It is not necessary, in alternate embodiments, that both claim concepts and limitation concepts be mapped. One or the other could suffice to permit screening. As a further example, the claim as a whole could be assigned to a claim concept "dog," wherein a definition of the concept dog includes a tail. Further, if the claim as a whole is assigned to the claim concept "dog," the claim may automatically assigned to parent concepts "canine" and "mammal" and a child concept "tail."

The results of the associating 304 and 306 are stored to provide search users of a system, such as system 200 of FIG. 2, the ability to not only search for patent claims by concept, but also to screen patent claims by concept. Some such embodiments provide searchers the ability to pin point specific claims and claim language of interest or concern when performing a screen as part of a freedom to operate opinion.

Some further embodiments of the method 300 include associating a portion of the patent document, such as a portion of a description section of a patent, patent application, or other document, to a claim. Such an assigned portion, in some embodiments, is a portion of the description providing support for the patent claim, or element thereof. In some embodiments, the assigned portion can be a portion of another document, such as a treatise generally accepted by one of skill in the relevant art. Some embodiments include associating one or more sentences of a description section to an individual claim element. This association information is stored to allow mappers or screeners quick reference to support and explanation of the various patent claims and claim elements in the patent documents when mapping or screening.

Figure 4:
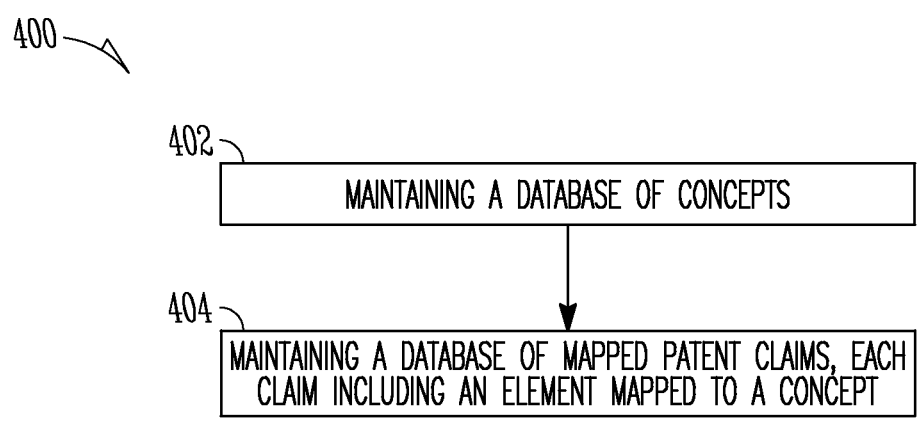
FIG. 4 is a method flow diagram of one example embodiment.

FIG. 4 is a method 400 flow diagram of one example embodiment. The method of this embodiment includes maintaining a database of concepts 402. The method 400 further includes maintaining a database of mapped patent claims, each claim including at least mapping to a concept 404. In other embodiments, a claim may only be assigned to a single claim concept and no elements or limitations in the claim are mapped. Or, a claim element may be mapped to a single limitation concept, and the claim as a whole not being mapped to a claim concept. Some such embodiments may further provide that the mapped elements being non-inherent elements of the mapped concept. For instance, if the claim concept is dog, inherent elements such as legs or head are not mapped to limitation concepts, as it is assumed that such elements have to be implicitly or explicitly present in the claim in order for it to be assigned to the claim concept dog. In some embodiments, the mapped patent claims include independent claims and not dependent claims.

Figure 5:
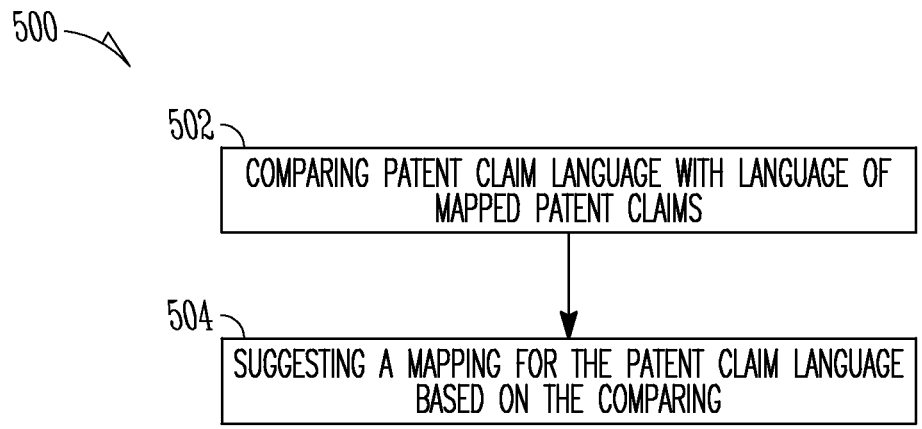
FIG. 5 is a method flow diagram of one example embodiment.

FIG. 5 is a method 500 flow diagram of one example embodiment for assisted patent mapping. The method 500 of this embodiment includes comparing patent claim language with language of mapped patent claims 502 and suggesting a mapping for the patent claim language based on the comparing 504. In some other embodiments, the claim language is mapped according to a concept schema. In such embodiments, the claim language is compared against and mapped according to concept definitions. In some further embodiments, claim language is compared against both concept definitions and previously mapped claim language.

Figure 6:
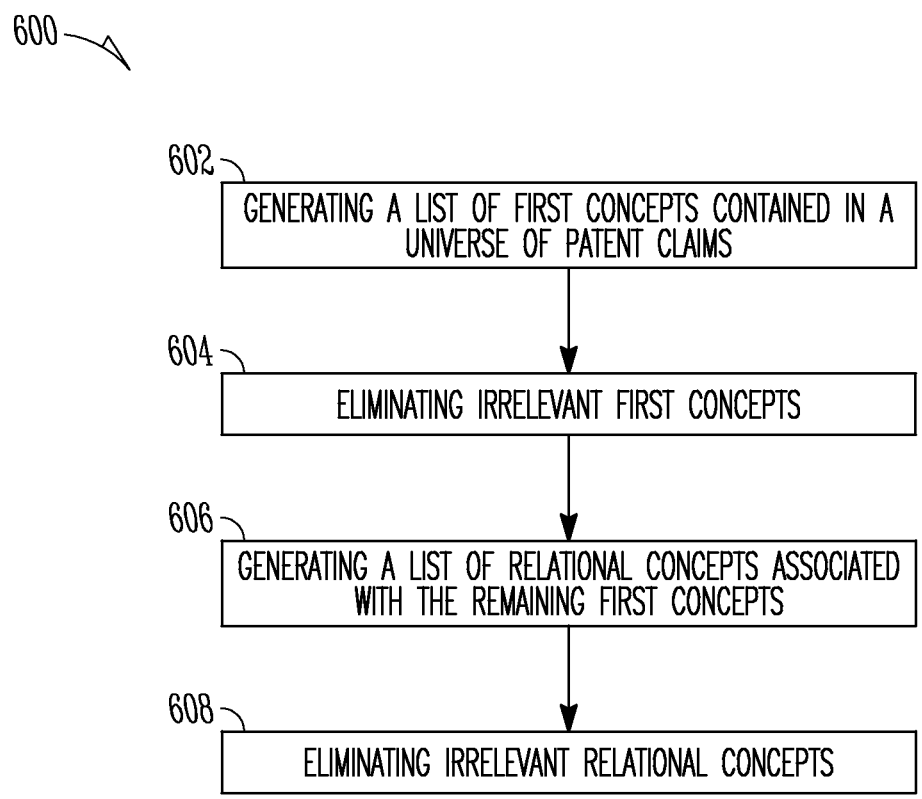
FIG. 6 is a method flow diagram of one example embodiment.

FIG. 6 is a method 600 flow diagram of one example embodiment for screening a universe or pool of patent documents. This pool may be arbitrarily selected from the available universe of mapped claims or patent documents. The method 600 includes generating a list of first claim or limitation concepts contained in the universe of patent claims 602 and eliminating irrelevant concepts 604. This embodiment further includes generating a list of remaining first concepts showing relationships, where applicable, between them 606 and eliminating irrelevant related concepts 608.

In some embodiments of the method 600, first concepts associated solely with eliminated relational concepts are eliminated upon elimination of the relational concept.

FIG. 7A-FIG. 7G illustrate user interfaces 700 of one example embodiment. The user interface 700 of FIG. 7A includes a hyperlinked listing of projects within a system. Selection of a project causes the user interface 710 of FIG. 7B to display.

Figure 7A:
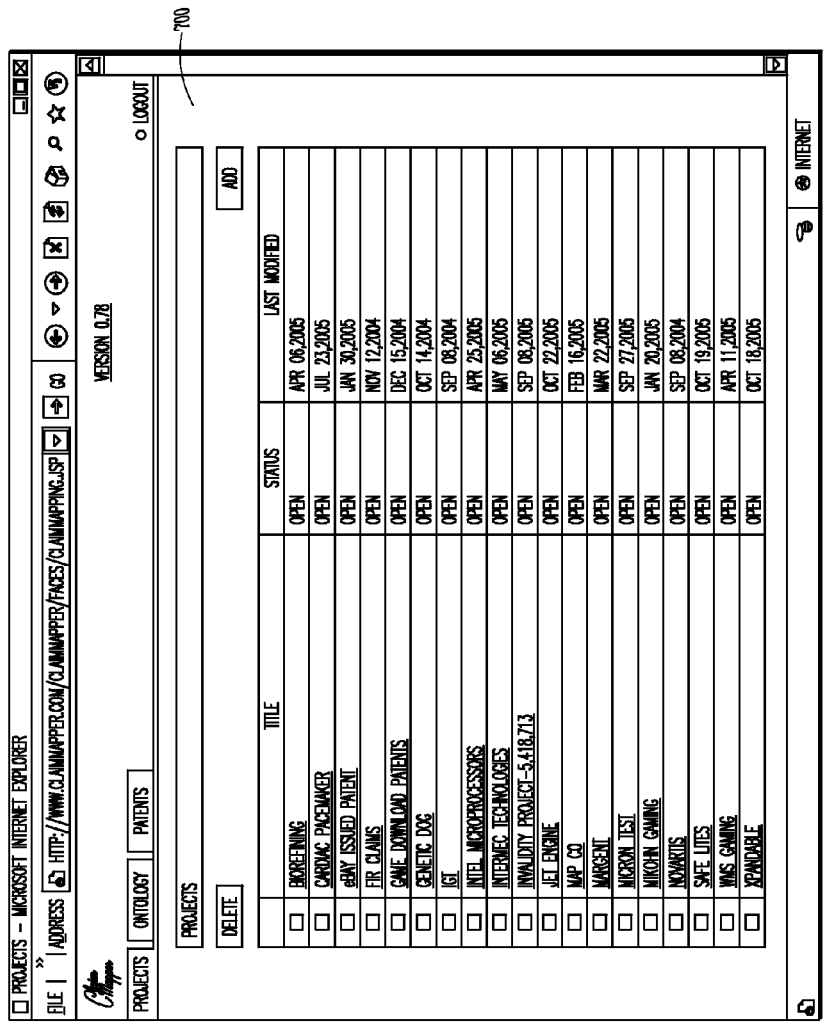
Figure 7B:
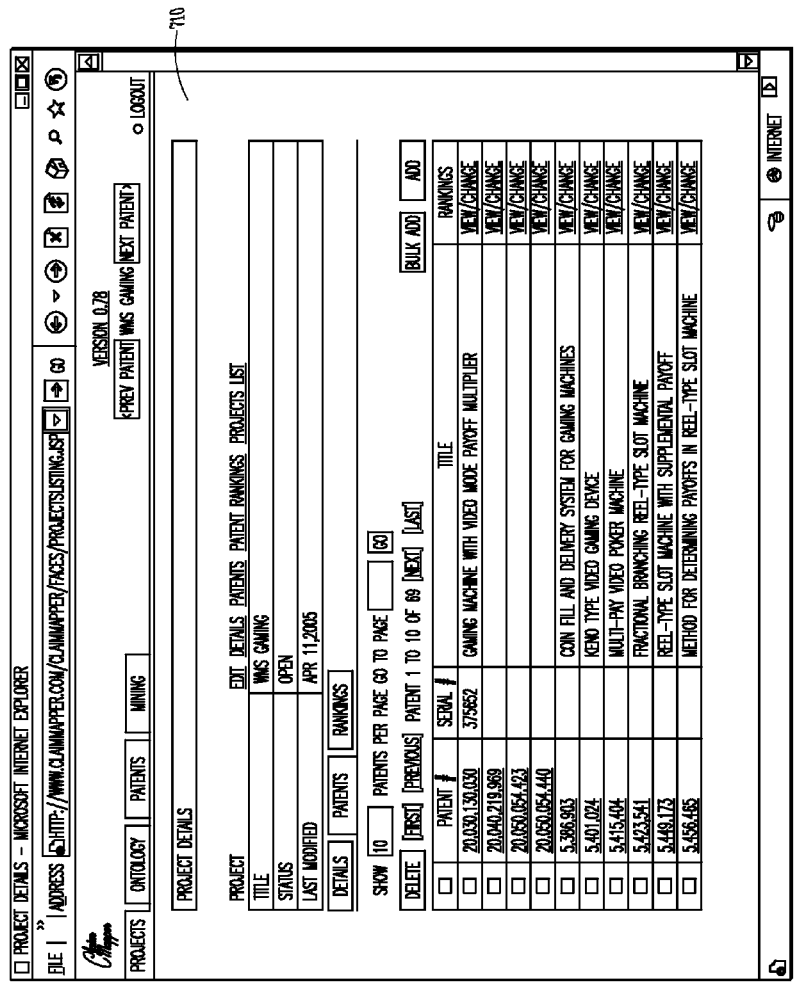

The user interface 710 of FIG. 7B includes a listing of patents and patent applications included within the selected project. The listing of patent and application numbers are hyperlinked to further details within the system regarding the respective patents and applications. Some embodiments, including the embodiment of FIG. 7B, include the functionality to rank patents and applications within a project. The ranking allows users to rank the various documents, such as by relevance to the particular project.

Figure 7C:
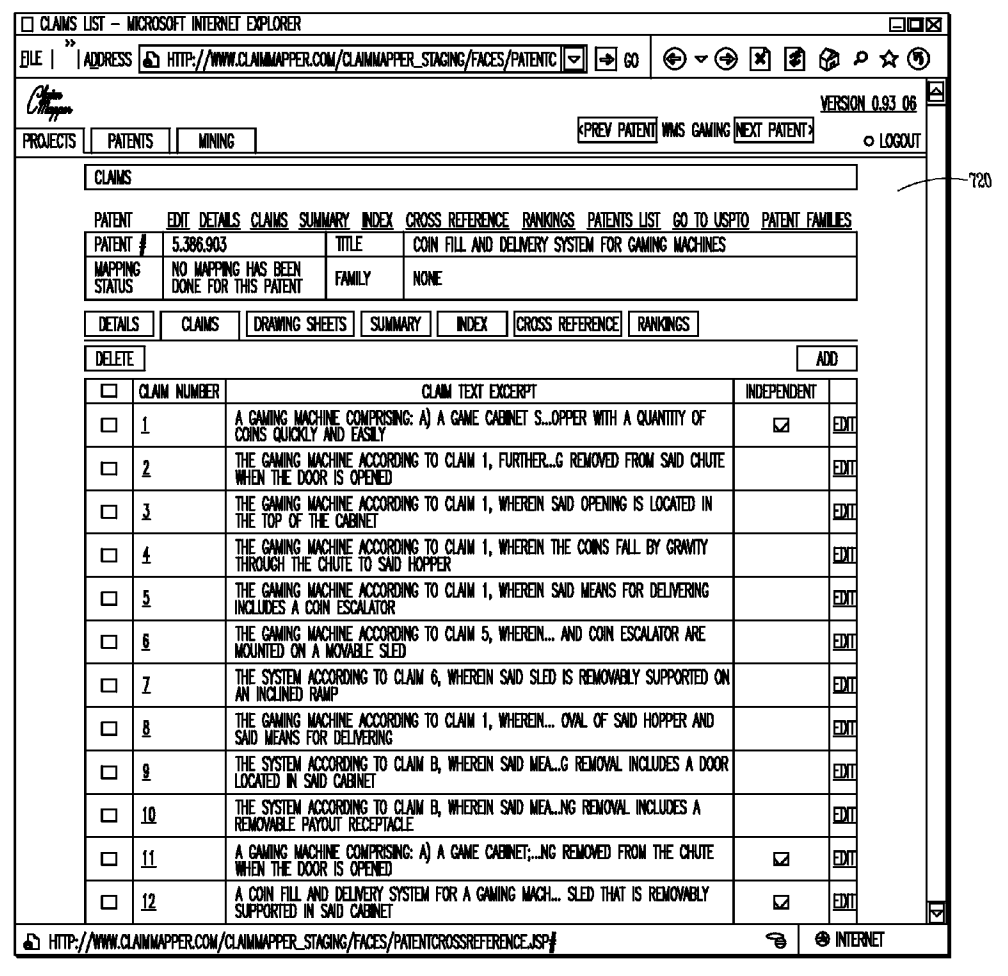

The user interface 720 of FIG. 7C provides claim details of a patent or patent application, such as claim language and an indication if the claim is independent or dependent. The user interface 720 further provides hyperlinks to other information regarding the patent or patent application displayed in the user interface 720 such as cross references to other project and patent information, drawings of the patent or patent application, information regarding a patent family of which the displayed patent or patent application is a member of, and other user interfaces within the system, such as the user interface 730 illustrated in FIG. 7D.

Figure 7D:
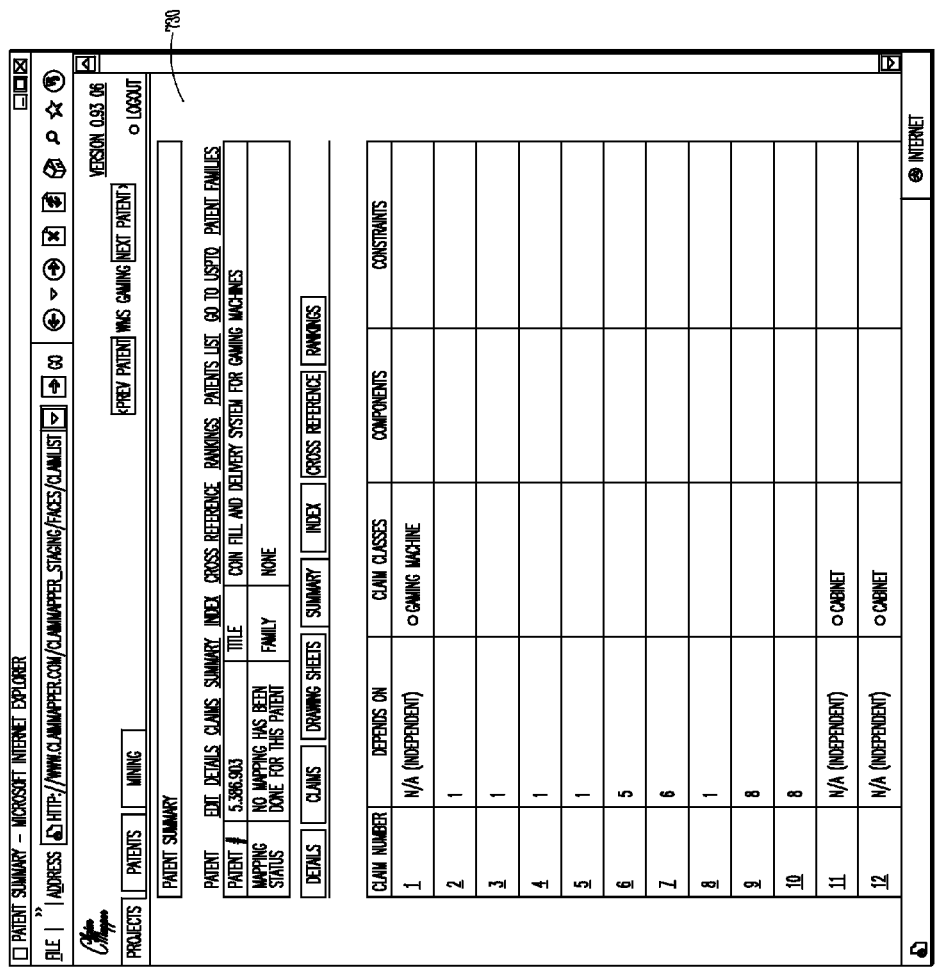

The user interface 730 of FIG. 7D provides further information about claims of a particular patent or patent application. This information includes claim dependencies and concepts, classes, components, and constraints to which each claim is related or pertains to. The user interface 730 further includes links to other user interfaces of the system similar to the other user interfaces described herein.

Figure 7E:
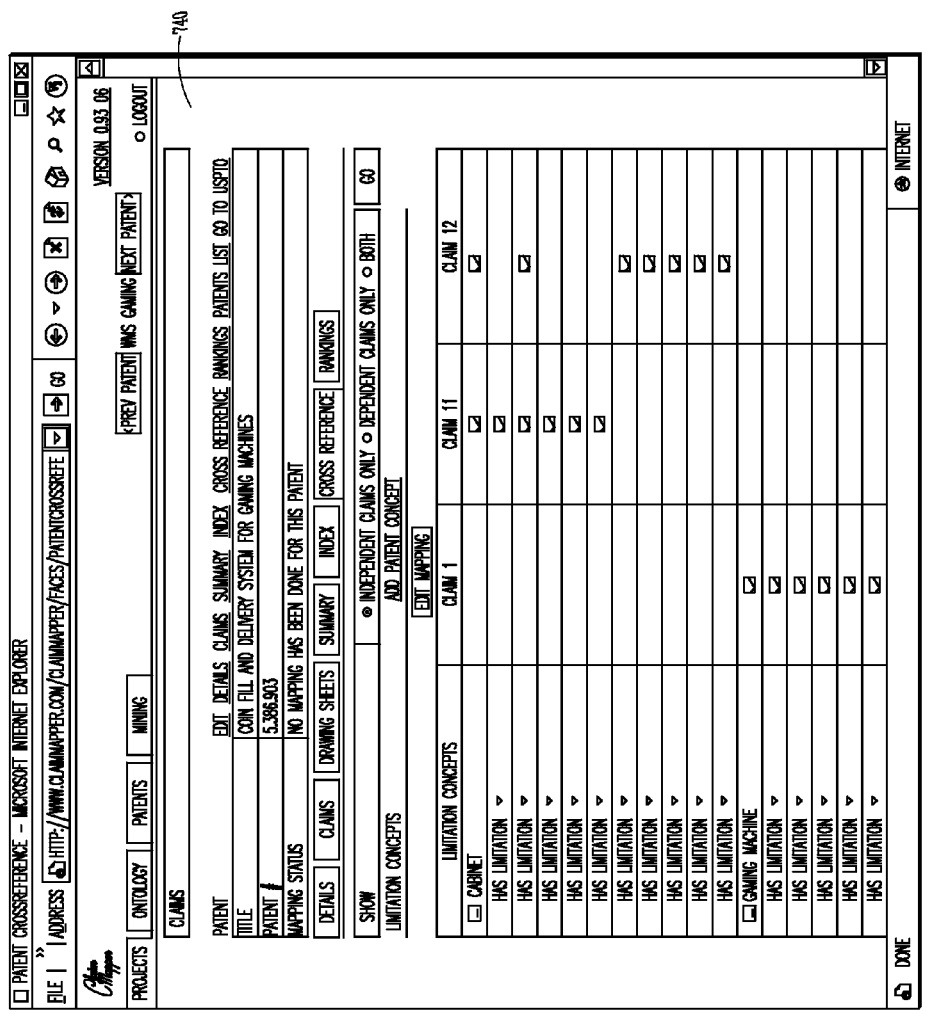

User interface 740 of FIG. 7E is another user interface within the example system. The user interface 740 includes a claim map of limitations to claims. Such claim maps provide graphical view of limitations within claims of a patent or patent application. This allows a user to quickly comprehend relationships between claims in a patent. In some embodiments, a claim map can include claims of one or more patents or patent applications to provide a graphical representation of related claims. Such maps can include maps of patent families and can illustrate the relationship of claim limitations within a patent family. These maps con include independent claims, dependent claims, or both.

Figure 7F:
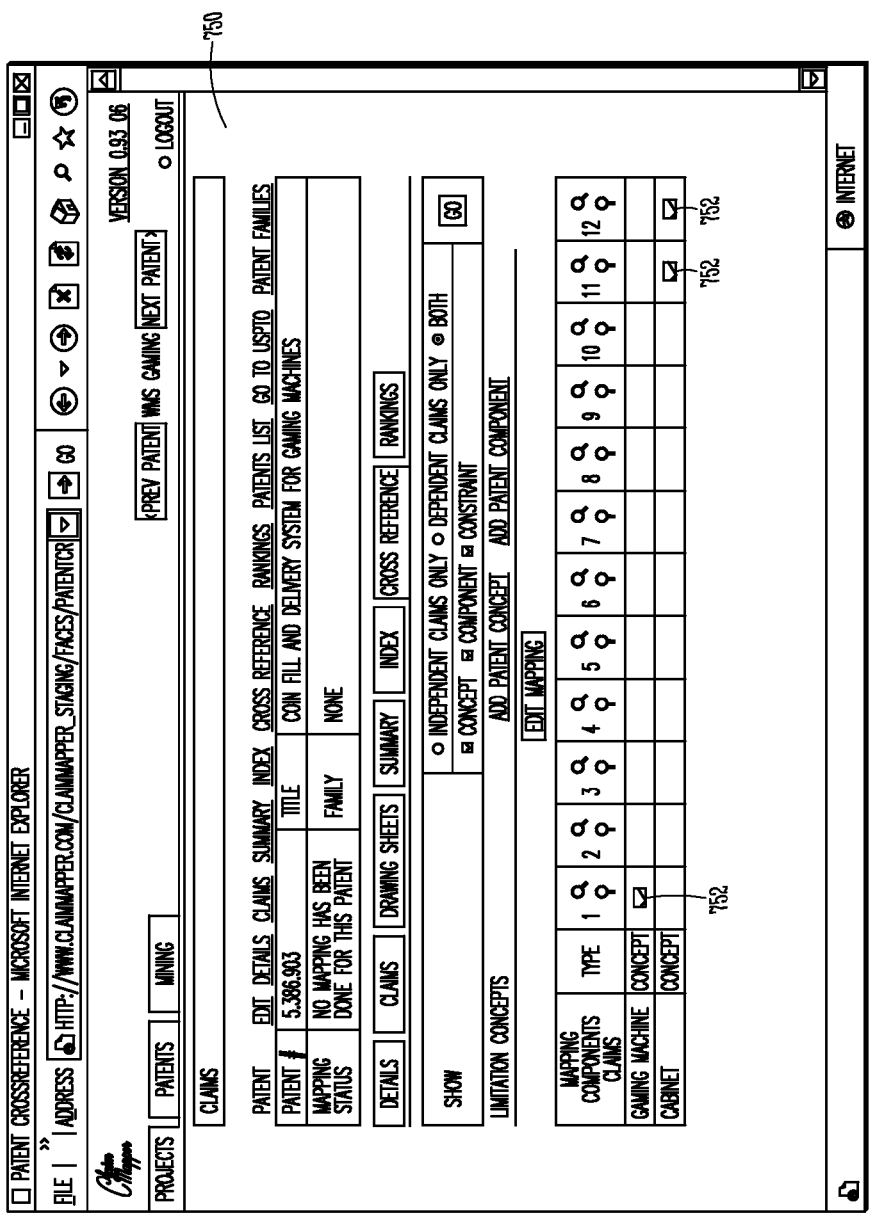

FIG. 7F illustrates a further user interface 750 illustrating another mapping of a set of claims 1-12. This map illustrates two concepts and an indication 752 of which claims include which concepts. This mapping can further indicate components and constraints that are included in the claims. Although the terms property, concept, component, and constraint are used in describing this and other embodiments, these terms are merely exemplary. Other terms can be used to describe various claim elements, sub-elements, high and low-level concepts, and subject matter contained within claims without departing from the present subject matter herein. These terms are merely labels of a hierarchy of claims and claim portions.

Figure 7G:
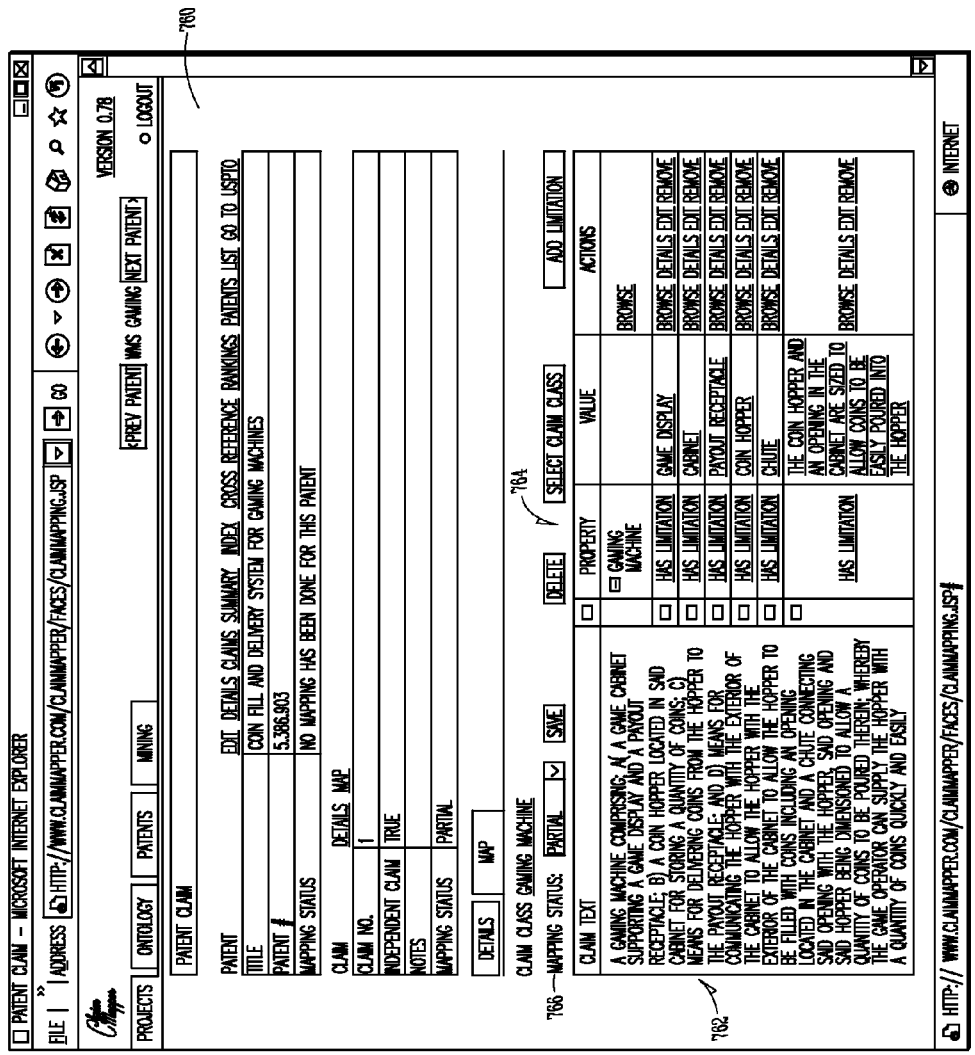

FIG. 7G provides yet another user interface 760 of one example embodiment. This user interface 760 provides a map of an individual claim. The user interface 760 includes all, or a portion, of the claim text 762 and a mapping 764 of the claim and its limitations. The mapping 764 includes a property of the claim and limitation values thereof. The mapping 764 can be edited, removed, or otherwise altered or deleted. The user interface 760 also provides a mapping 764 status indicator 766. The mapping 764 status can include none, partial, or complete.

The various user interfaces of FIG. 7A-7G present information to users about patent claims. Each user interface provides the claim information in a slightly different manner and with varying detail to allow users to view, create, edit, and delete data depending on various user needs.

The claim mapping device is scalable in that it is usable for both mapping of claims in a single patent, a small group of patents, a large portfolio of patents and patents in a technology area. FIGS. 7A to 7G illustrate claim mapping screens for performing mapping on claims in a single patent. The mapping screens create a report on features of the patent, such as title and issuance date and inventors. The mapping report also includes features of the claims such as common elements within the claims. Users may identify concepts using the claim language itself or using an ontology developed by the users themselves. Thus, the claim mapping device described herein is useful for creating a local ontology, useful for analyzing claims in a single patent.

The claim mapping device is also usable for mapping claims in a small collection of patents, such as patents of a particular inventor or patents asserted in a litigation matter. In this instance, users also create an ontology for describing concepts and components of the claims, which has local application to the collection of claims under consideration. In particular, the ontology may include concepts and components which are pertinent to the claims being analyzed but may not include all of the concepts and components that are parts of a larger art group or technology area.

The claim mapping device also has use in global mapping of patent portfolios or all patents within a particular art or technology area. In this embodiment, users create an ontology of concepts and components that are usable across a spectrum of claims in many patents. For each claim analyzed, the user selects the concepts and components from the ontology. If the ontology does not have the concept or component, the user adds it. As a result, the ontology is built and expanded for subsequent users. For some embodiments, as ontologies are created, the claim mapping device is capable of automatically mapping at least a portion of claims analyzed.

The claim mapping device is scalable in that it is usable for both mapping of claims in a single patent, a small group of patents, a large portfolio of patents and patents in a technology area.

Figure 8A:
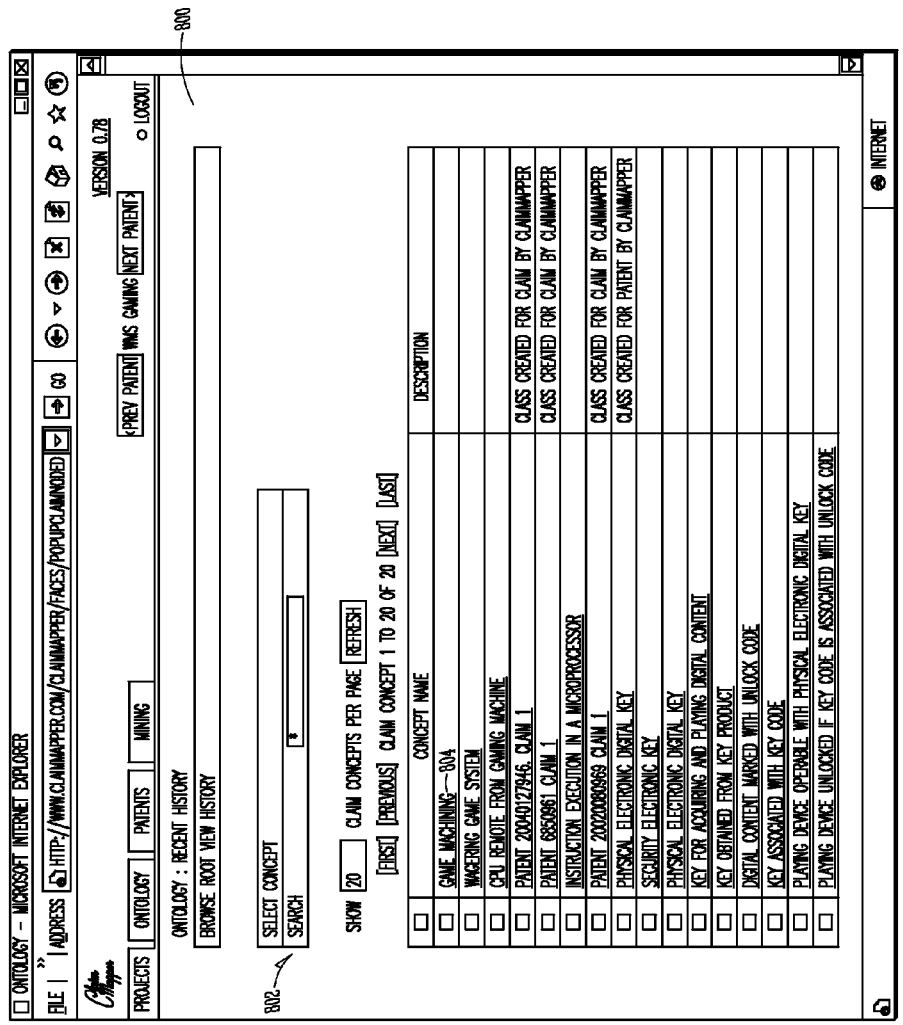
FIG. 8A-FIG. 8C illustrate user interfaces of example embodiments.

FIG. 8A is a user interface 800 of one example embodiment. The user interface 800 provides a text search field 802 to search various documents, such as patents and patent applications, included within an example system. The search field 802 allows users to enter terms to search against the example system database of concepts mapped to claims. The results of such a search are displayed in the user interface 800 by concept name. The user interface 800 further displays a description of displayed claim concepts if such a description exists in the database. The concept names are hyperlinked to allow users to select the concept name to view further information about the concept. An example of further information about the "Gaming Machine" concept 804 is illustrated in FIG. 8B.

Figure 8B:
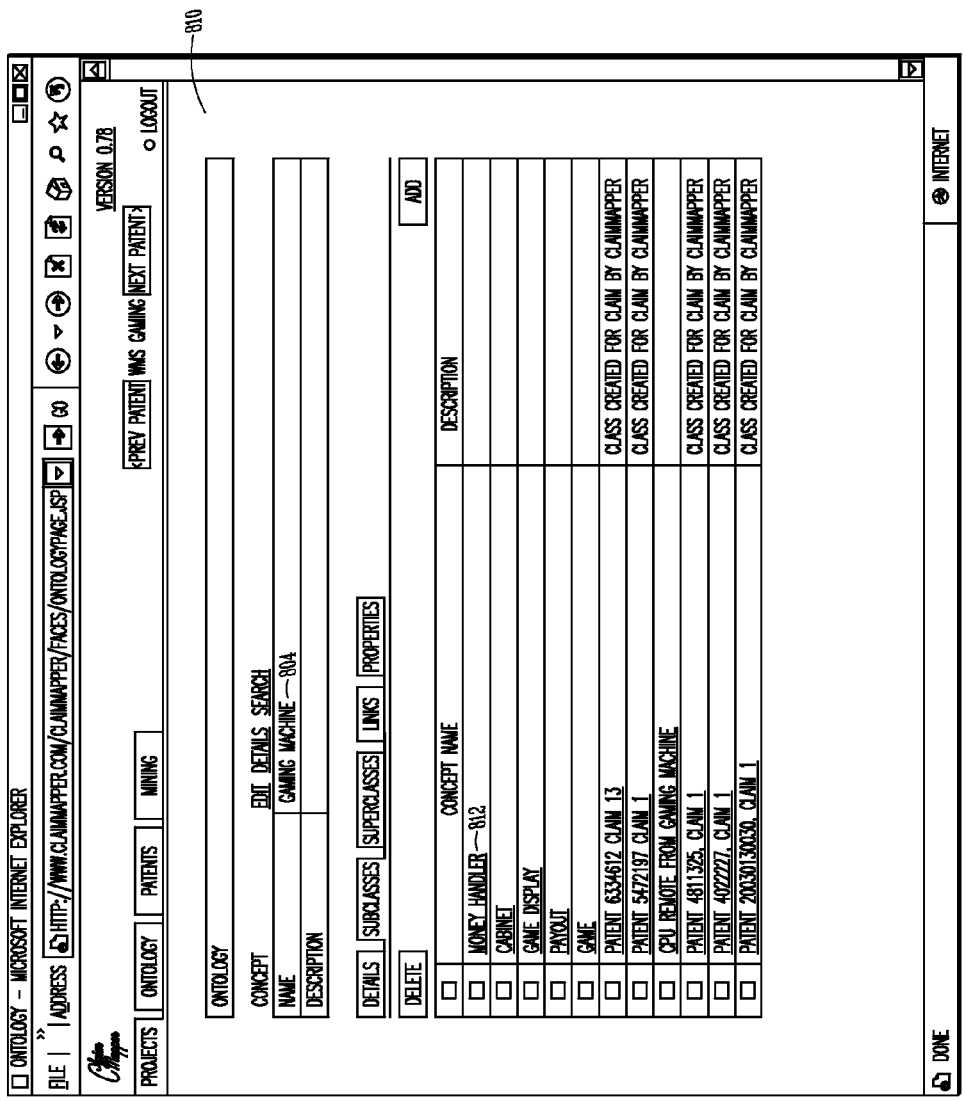
Figure 8C:
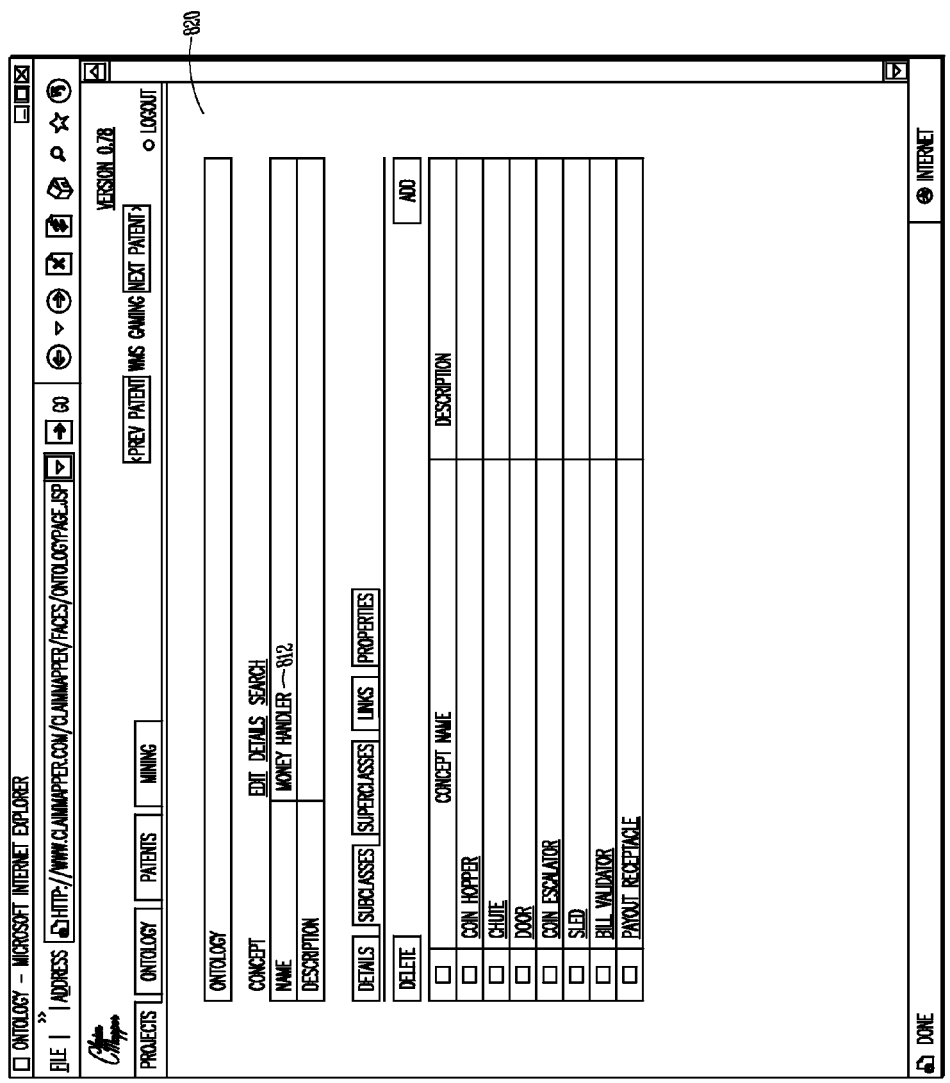

FIG. 8B illustrates a user interface 810 providing the further information about the "Gaming Machine" concept 804. The user interface 810 displays sub-concepts of the parent concept "Gaming Machine" 804. These sub-concepts, such as "Money Handler" 812, are hyperlinked to provide further information about the sub-concept. Selection of a sub-concept hyperlink, such as "Money Handler" 812, causes user interface 820 of FIG. 8C to be displayed. User interface 820 displays further sub-concepts of the selected "Money Handler" 812 sub-concept. The further sub-concepts are also hyperlinked, the selection of which will provide further details of the selection.

Figure 9A:
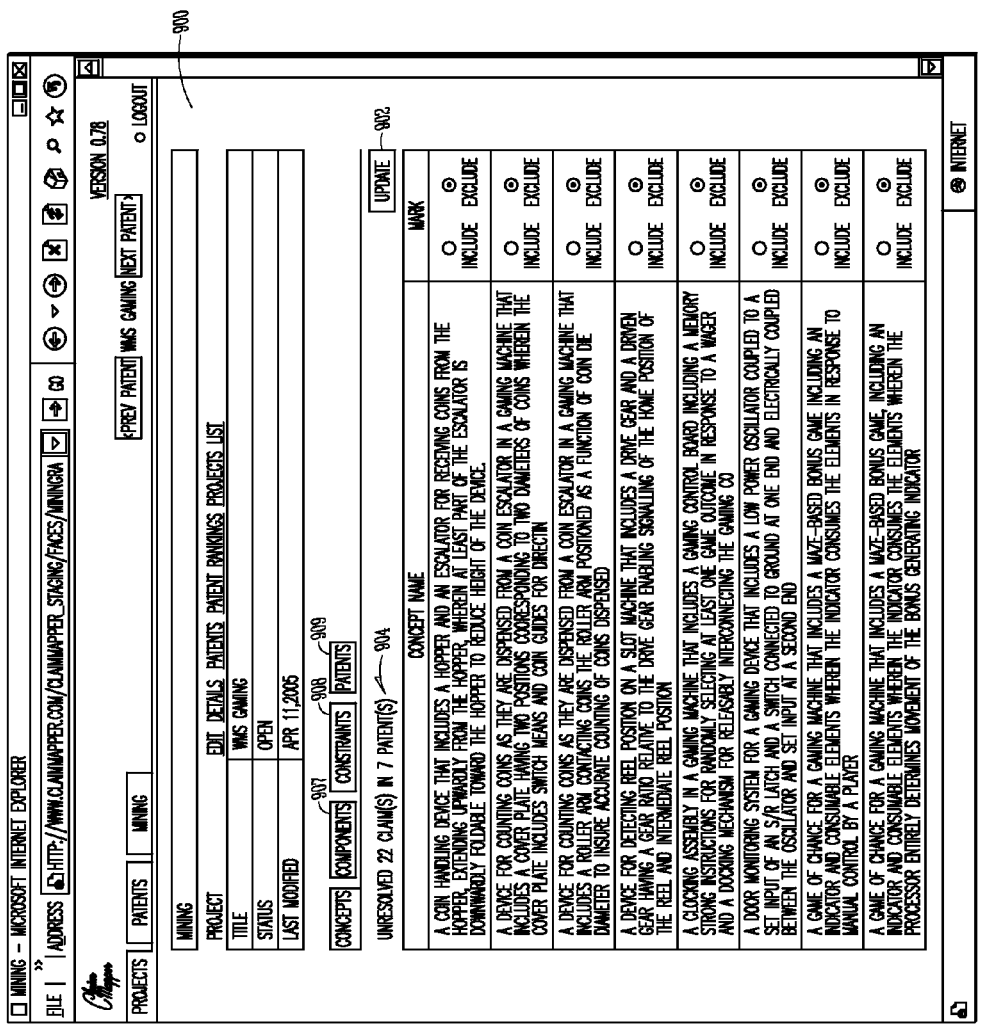
FIG. 9A-FIG. 9C illustrate user interfaces of example embodiments.

FIG. 9A illustrates a user interface 900 that provides a listing of concepts included within a database of an example system. The user interface 900 is useful to users searching for relevant patents and patent application for purposes such as a clearance search. The user interface 900 allows users review concepts 906 and select to include or exclude the concept from the search. After a user selects concepts 906 to include and exclude from the search, the user can select the "Update" button 902. Selection of the "Update" button 902 causes a result count 904 to be updated to reflect the number of claims and patents resulting from the concept 906 selections. The user can then select another tab, such as "Components" tab 907, "Constraints" tab 908, or "Patents" tab 909.

Figure 9B:
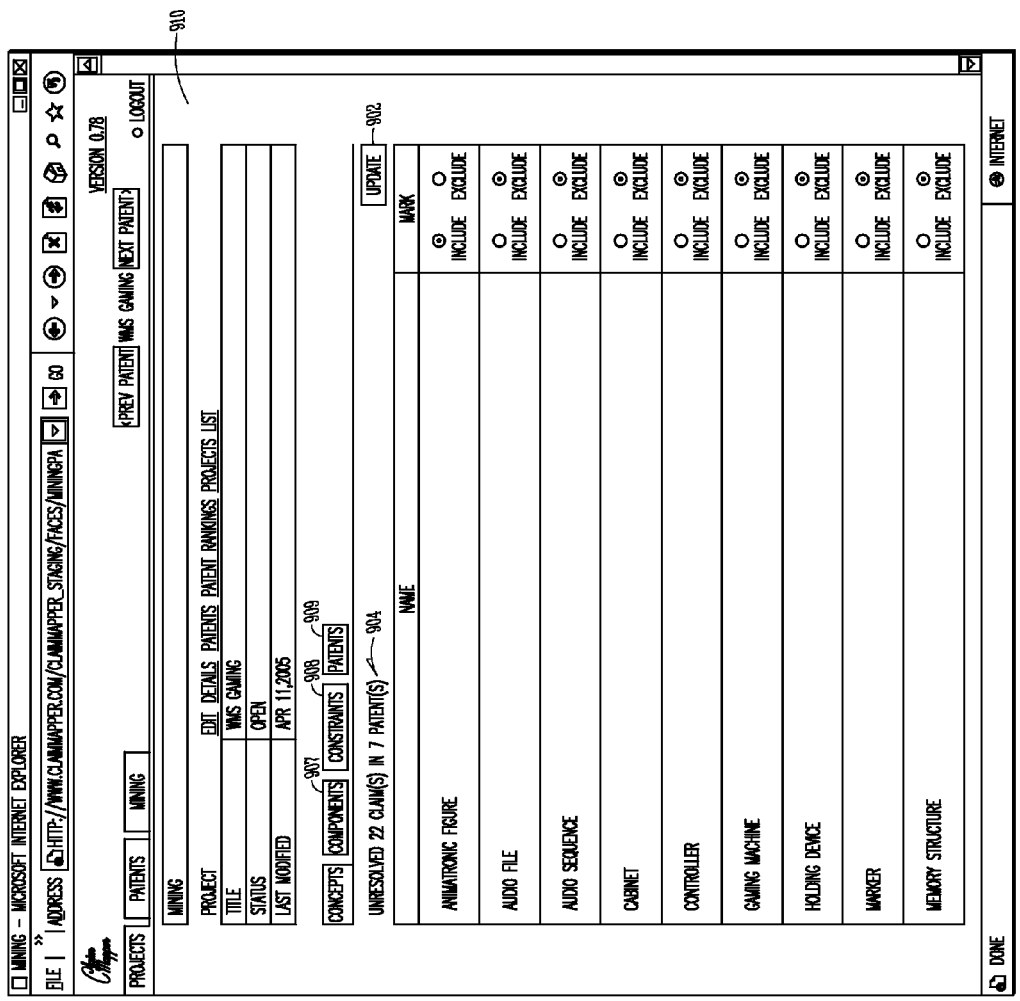

Selection of the "Components" tab 907 causes user interface 910 of FIG. 9B to be displayed. The components 912 included in the display are components that remain in the result set after inclusion and exclusion of concepts selected in the user interface 900 of FIG. 9A. Returning to FIG. 9B, the user can then select components 904 to include or exclude from the search. Then the user can select the "Update" tab 902 to update the result count 904. The user can further reduce the result set reflected in the result count 904 using a constraints user interface that operates in a similar fashion as user interfaces 900 of FIG. 9A and 910 of FIG. 9B. The constraints user interface is displayable by selecting the "Constraints" tab 908.

Figure 9C:
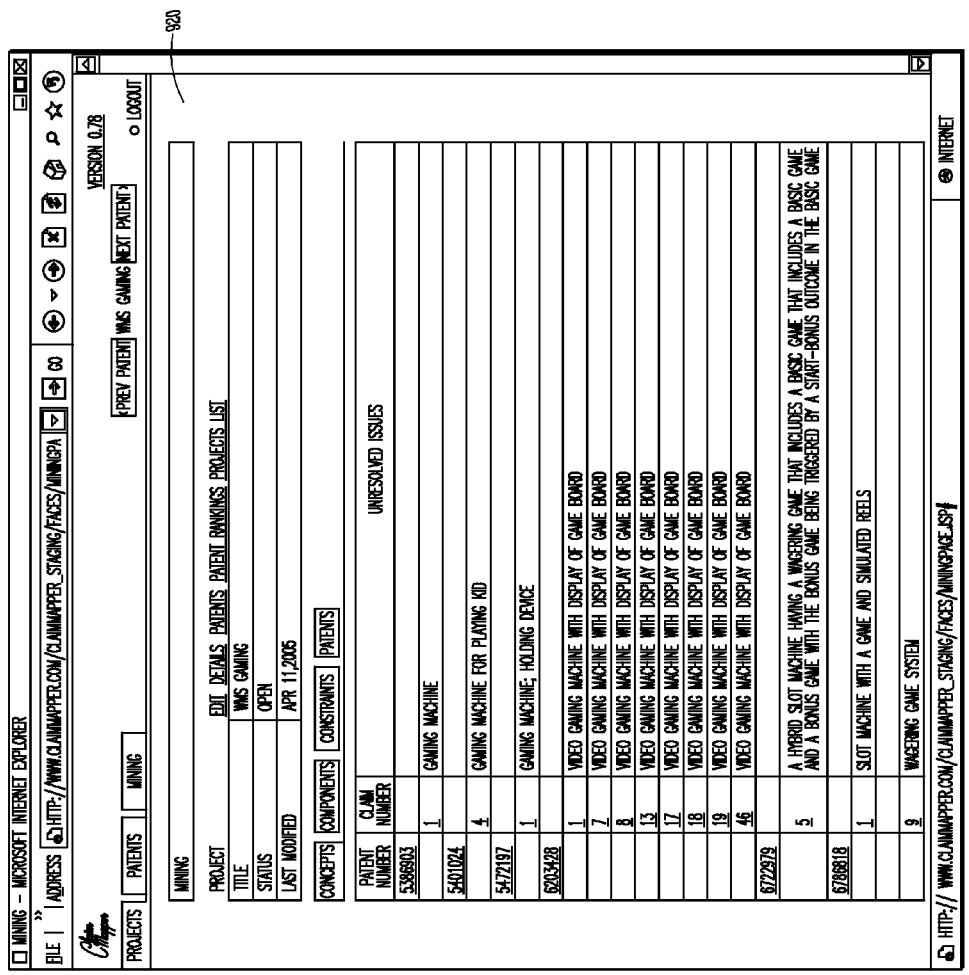

Once the user has reduced the result set, or at any time, the user can select the "Patents" tab 909. Selection of the "Patents" tab 909 causes the user interface 920 of FIG. 9C to display. The user interface 920 displays results of the search as described above with regard to FIG. 9A and FIG. 9B. The display of the search results includes identified patent or patent application numbers, identified claim numbers, and unresolved issues within the claims that prevents elimination of the claim from the search. The user can the resolve those issues to determine whether the patent claim is relevant to the purpose of the search. An unresolved issue can include a claim concept, component, or constraint that the user has not chosen to eliminate from the search. If the user decides to further eliminate concepts, components, or constraints from the search, the user can the select the respective tabs to cause the respective user interface to display, from which the search can be further limited.

Figure 10A:
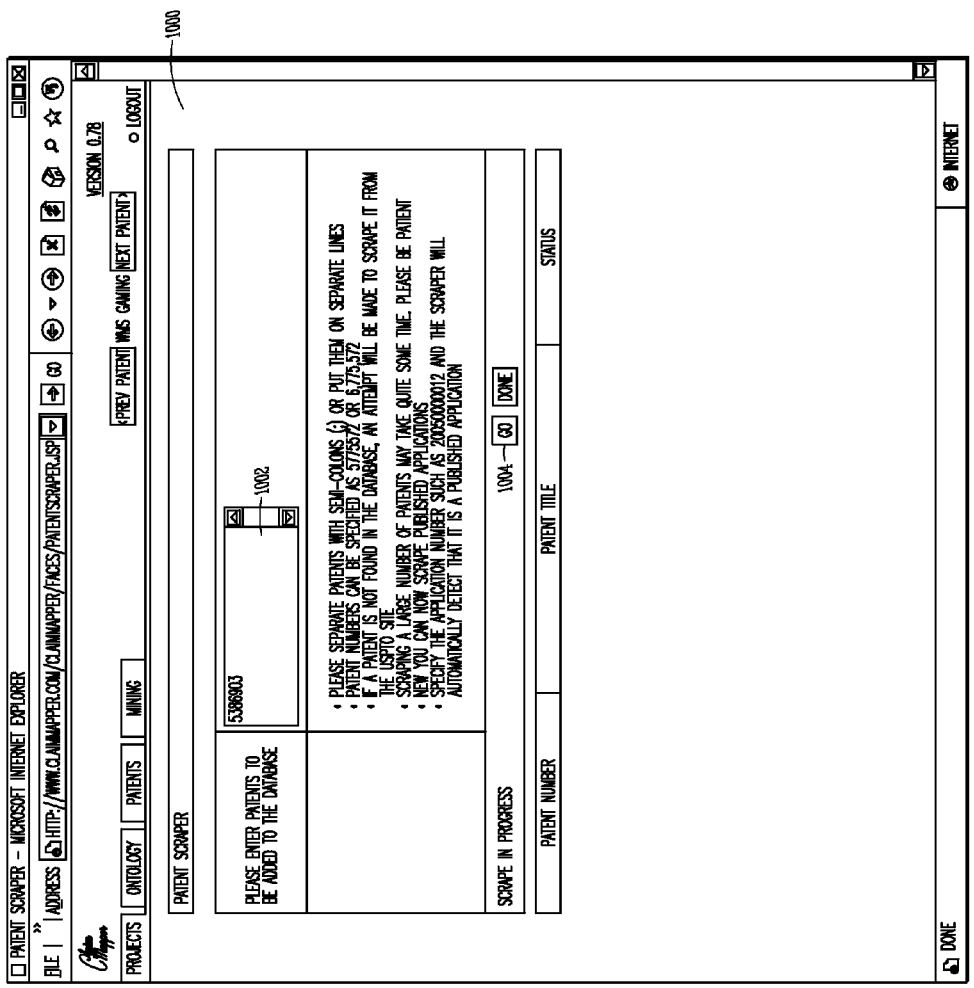
FIG. 10A-FIG. 10B illustrate user interfaces of example embodiments.
Figure 10B:
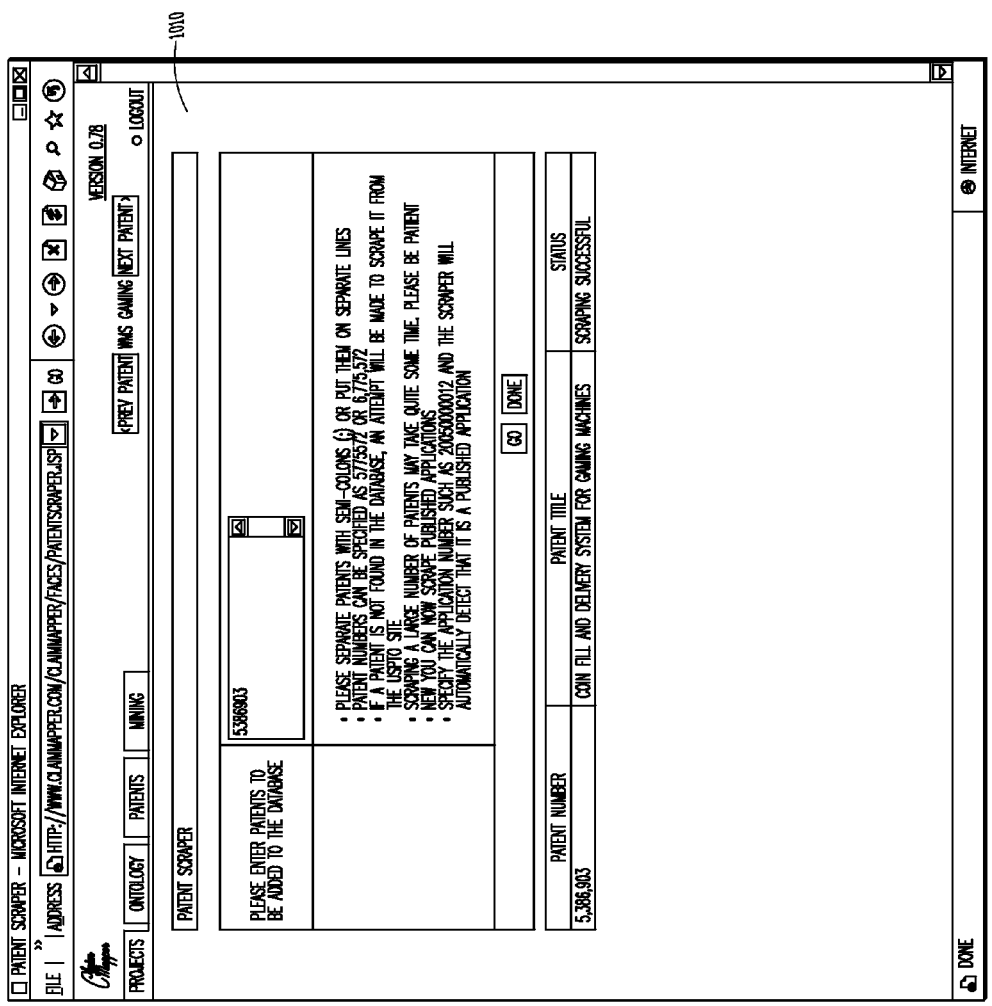

FIG. 10A and FIG. 10B illustrate user interfaces according to example Embodiments. The user interface 1000 of FIG. 10A provides user the ability to enter one or more patent numbers in a text box 1002 and select action button "Go" 1004. Selection of the action button "Go" 1004 causes the user interface 1000 to submit the entered patent numbers to an example system which then obtains a copy of the document identified by the patent number and enter the document in the example system database. The example system obtains the copy of the document electronically from another database, such as a patent office database available on the Internet. The example system then parses the electronic document to extract various elements of information such as claims, claim concepts, claim limitations, document title, filing date, classification, descriptive text related to claim terms, concepts, and limitations, and various other elements of information. Once the example system is compete with the parsing, the example system stores the information in a database and cause user interface 1010 of FIG. 10B to be displayed to the user.

It is understood that the above description is intended to be illustrative, and not restrictive. Many other embodiments will be apparent to those of skill in the art upon reviewing the above description. The scope of the inventive subject matter should, therefore, be determined with reference to the appended claims, along with the full scope of equivalents to which such claims are entitled.

What is claimed is:

1. A method comprising:
assembling a concept pool from claims mapped to concepts in patents of a patent pool, the patents of the patent pool, data representative of the concepts, and mappings of at least the claims of the patents in the patent pool to the concepts stored in a database;
receiving input related to concepts in the concept pool, the input designating at least one concept of the concept pool as irrelevant; and
removing a patent from the patent pool based on the received input when the received input designates at least one concept mapped to each claim of the patent as irrelevant.

2. The method of claim 1, wherein a portion of a claim stored in the database includes a mapping to one or more portions of a document describing the portion of the claim.

3. The method of claim 2, wherein the document is a patent document in which the claim is present.

4. A system comprising:
at least one processor, at least one memory device, and at least one data storage device;
a database management system that stores and manages patent data, concept data, and mappings of the concept data to the patent data, including mappings of patent claims to concepts represented in the concept data, on the at least one data storage device;
a searching unit held in the at least one memory device and executable by the at least one processor to:
from the data stored and managed by the database management system, assemble a concept pool from patent claims mapped to concepts in patents of a patent pool;
receive input related to concepts in the concept pool, the input designating at least one concept of the concept pool as irrelevant;
removing a patent from the patent pool based on the received input when the received input designates at least one concept mapped to each claim of the patent as irrelevant.

5. The system of claim 4, wherein a portion of a claim includes a mapping to one or more portions of a document describing the portion of the claim.

6. The system of claim 5, wherein the document is a patent document in which the claim is present.

7. A non-transitory computer-readable medium, with instructions stored thereon, which when executed by a processor, cause a computer to perform a method comprising:
assembling a concept pool from claims mapped to concepts in patents of a patent pool, the patents of the patent pool, data representative of the concepts, and mappings of at least the claims of the patents in the patent pool to the concepts stored in a database;
receiving input related to concepts in the concept pool, the input designating at least one concept of the concept pool as irrelevant;
removing a patent from the patent pool based on the received input when the received input designates at least one concept mapped to each claim of the patent as irrelevant.

8. The non-transitory computer-readable medium of claim 7, wherein a portion of a claim stored in the database includes a mapping to one or more portions of a document describing the portion of the claim.

9. The non-transitory computer-readable medium of claim 8, wherein the document is a patent document in which the claim is present.

* * * * *

UNITED STATES PATENT AND TRADEMARK OFFICE
CERTIFICATE OF CORRECTION

PATENT NO. : 9,659,071 B2  
APPLICATION NO. : 14/949549  
DATED : May 23, 2017  
INVENTOR(S) : Lundberg et al.

Page 1 of 1

It is certified that error appears in the above-identified patent and that said Letters Patent is hereby corrected as shown below:

On page 6, in Column 2, under "Other Publications", Line 25, delete "PCTIUS2005/026768," and insert --PCT/US2005/026768,-- therefor On page 7, in Column 1, under "Other Publications", Line 6, after "Paula,", insert --"Image File Wrapper (IFW) Processing",--

On page 7, in Column 1, under "Other Publications", Line 14, delete "5," and insert --S,-- therefor On page 7, in Column 1, under "Other Publications", Line 17, delete "5," and insert --S,-- therefor Signed and Sealed this  
Eighth Day of May, 2018

Andrei Iancu  
*Director of the United States Patent and Trademark Office*